US011718313B2

United States Patent
Otaki et al.

(10) Patent No.: US 11,718,313 B2
(45) Date of Patent: *Aug. 8, 2023

(54) AUTONOMOUS DRIVING SYSTEM AND CONTROL METHOD OF AUTONOMOUS DRIVING SYSTEM

(71) Applicant: TOYOTA JIDOSHA KABUSHIKI KAISHA, Toyota (JP)

(72) Inventors: Sho Otaki, Yokohama (JP); Yasuo Sakaguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

This patent is subject to a terminal disclaimer.

(21) Appl. No.: 17/520,004

(22) Filed: Nov. 5, 2021

(65) Prior Publication Data

US 2022/0055646 A1 Feb. 24, 2022

Related U.S. Application Data

(63) Continuation of application No. 16/397,447, filed on Apr. 29, 2019, now Pat. No. 11,492,000.

(30) Foreign Application Priority Data

May 25, 2018 (JP) ................................. 2018-100893

(51) Int. Cl.
*B60W 50/14* (2020.01)
*B60W 30/18* (2012.01)
*G06V 20/58* (2022.01)

(52) U.S. Cl.
CPC .......... *B60W 50/14* (2013.01); *B60W 30/181* (2013.01); *G06V 20/584* (2022.01); *B60W 2050/143* (2013.01)

(58) Field of Classification Search
CPC ............... B60W 10/18; B60W 30/181; B60W 30/18154; B60W 30/18159; B60W 30/18;
(Continued)

(56) References Cited

U.S. PATENT DOCUMENTS 8,818,608 B2   8/2014   Cullinane
10,471,956 B2  11/2019  Kim
(Continued)

FOREIGN PATENT DOCUMENTS

DE   102015226728 A1   6/2017
EP       2944532 A2    11/2015
(Continued)

OTHER PUBLICATIONS

Office Action dated Nov. 8, 2021 in U.S. Appl. No. 16/397,447.
(Continued)

*Primary Examiner* — Russell Frejd
*Assistant Examiner* — Brandon Z Willis
(74) *Attorney, Agent, or Firm* — Sughrue Mion, PLLC

(57) ABSTRACT

An autonomous driving system configured to perform an autonomous driving of a vehicle includes a trigger input request unit configured to perform a trigger input request for requesting a driver of the vehicle to perform a trigger input for causing the vehicle to pass through a target point if the autonomously driving vehicle approaches the target point set in advance and positioned on a traveling route of the vehicle, a trigger input detection unit configured to detect the driver's trigger input, and a vehicle control unit configured to cause the vehicle to pass through the target point if the trigger input is detected, and causes the vehicle to decelerate and stop without passing through the target point if the trigger input is not detected.

15 Claims, 17 Drawing Sheets

(58) Field of Classification Search
CPC .... B60W 30/14; B60W 30/143; B60W 50/14; B60W 2050/143; B60W 2050/146; B60W 50/08; B60W 50/10; B60W 60/001; B60W 60/0018; B60W 60/0015; B60W 2420/40; B60W 2420/403; B60W 2520/04; B60W 2555/60; B60W 2720/106; B60W 2540/10; B60W 2540/12; B60W 2540/215; B60W 2540/21; G08G 1/0962; G08G 1/0967; G08G 1/096725; G06V 20/58; G06V 20/584

See application file for complete search history.

(56) References Cited

U.S. PATENT DOCUMENTS

| | | |
|---|---|---|
| 2006/0167784 A1 | 7/2006 | Hoffberg |
| 2007/0087756 A1 | 4/2007 | Hoffberg |
| 2008/0109343 A1 | 5/2008 | Robinson et al. |
| 2013/0325241 A1 | 12/2013 | Lombrozo |
| 2015/0344040 A1 | 12/2015 | Heckmann et al. |
| 2017/0220045 A1 | 8/2017 | Templeton |
| 2018/0088572 A1 | 3/2018 | Uchida et al. |
| 2018/0326995 A1 | 11/2018 | Hiramatsu et al. |
| 2018/0348751 A1 | 12/2018 | Newman |
| 2019/0025825 A1 | 1/2019 | Takahama |
| 2019/0317499 A1 | 10/2019 | Imai et al. |
| 2019/0359227 A1 | 11/2019 | Otaki |
| 2020/0026284 A1 | 1/2020 | Hiramatsu |

FOREIGN PATENT DOCUMENTS

| | | |
|---|---|---|
| EP | 3372466 A1 | 9/2018 |
| EP | 3 518 209 A1 | 7/2019 |
| JP | 2005-301519 A | 10/2005 |
| JP | 2010-191518 A | 9/2010 |
| JP | 2013-218571 A | 10/2013 |
| JP | 2016-1461 A | 1/2016 |
| JP | 2016-24572 A | 2/2016 |
| JP | 2016137819 A | 8/2016 |
| JP | 2017-132290 A | 8/2017 |
| WO | 2017/077598 A1 | 5/2017 |
| WO | 2018/055731 A1 | 3/2018 |

OTHER PUBLICATIONS

Notice of Allowance dated Aug. 25, 2022 by the U.S. Patent and Trademark Office in U.S. Appl. No. 16/397,447.

Office Action dated Apr. 28, 2023 in U.S. Appl. No. 17/520,334.

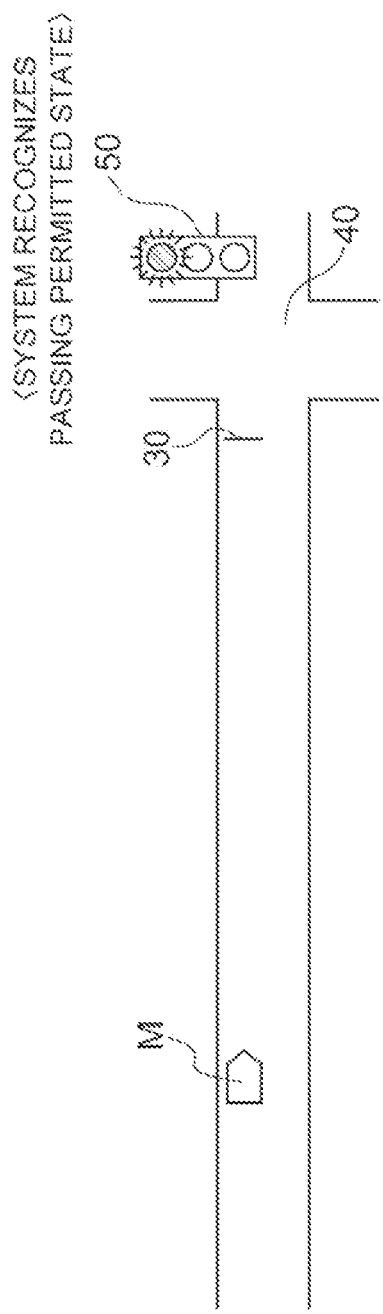
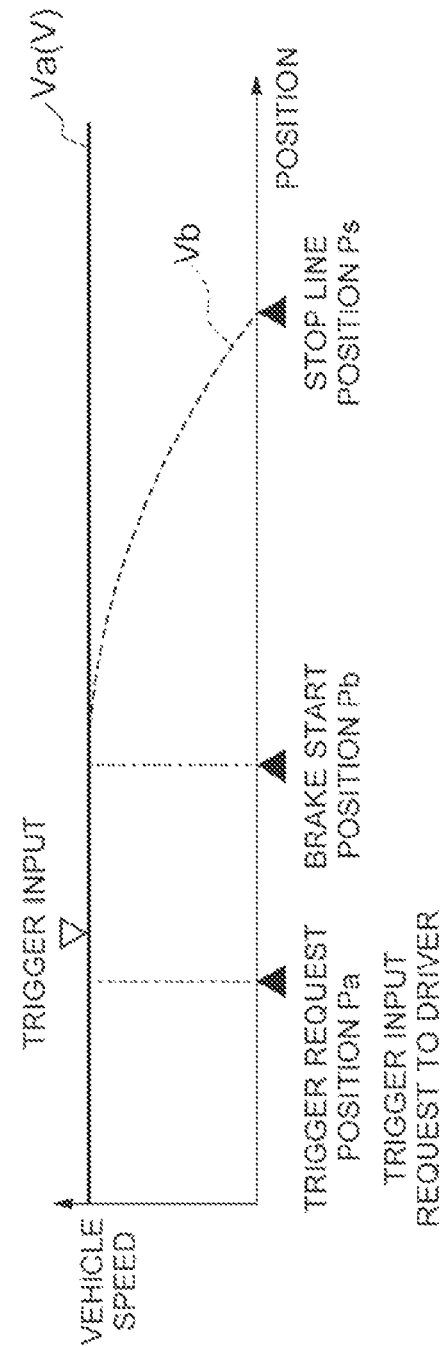

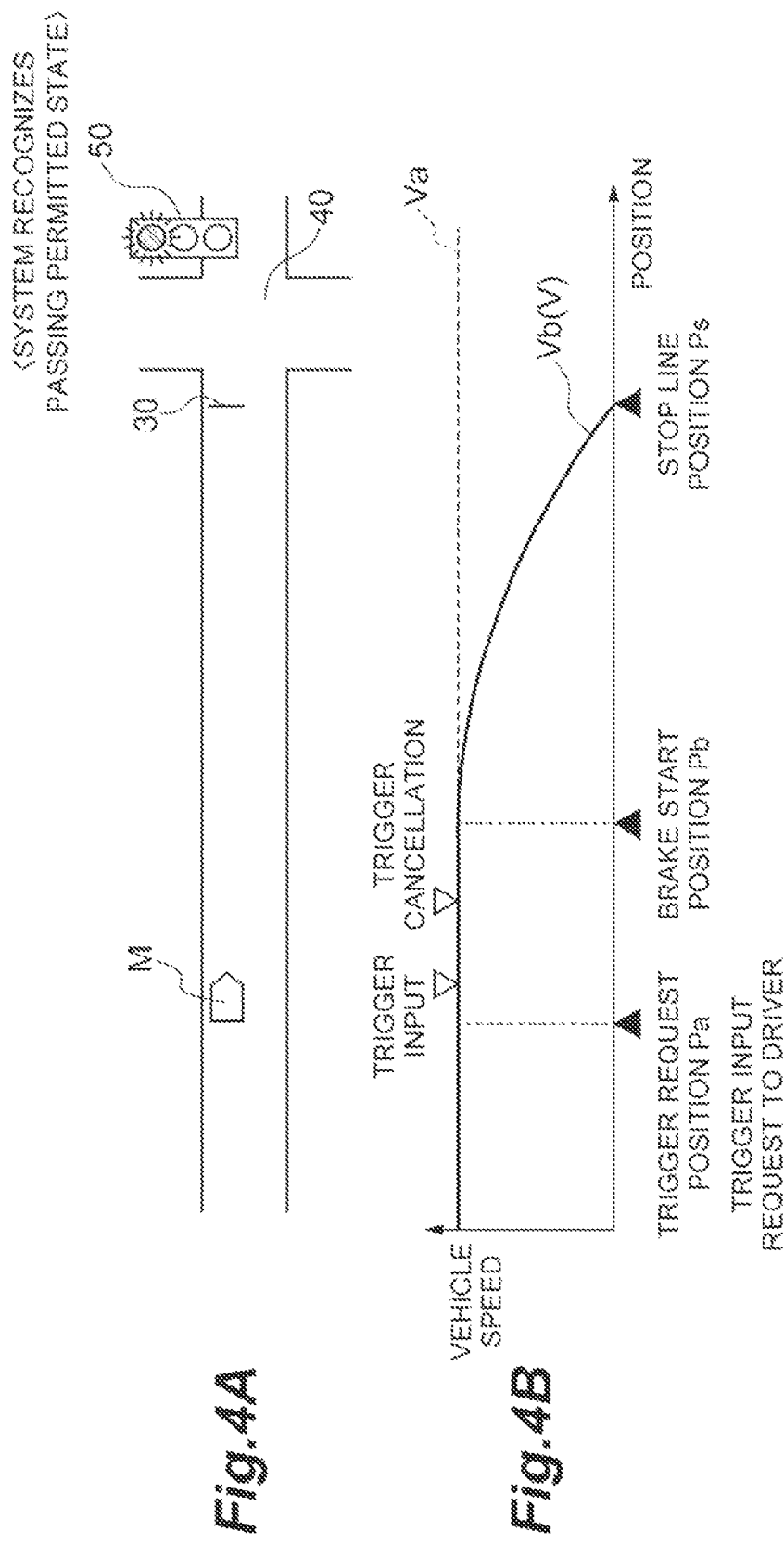

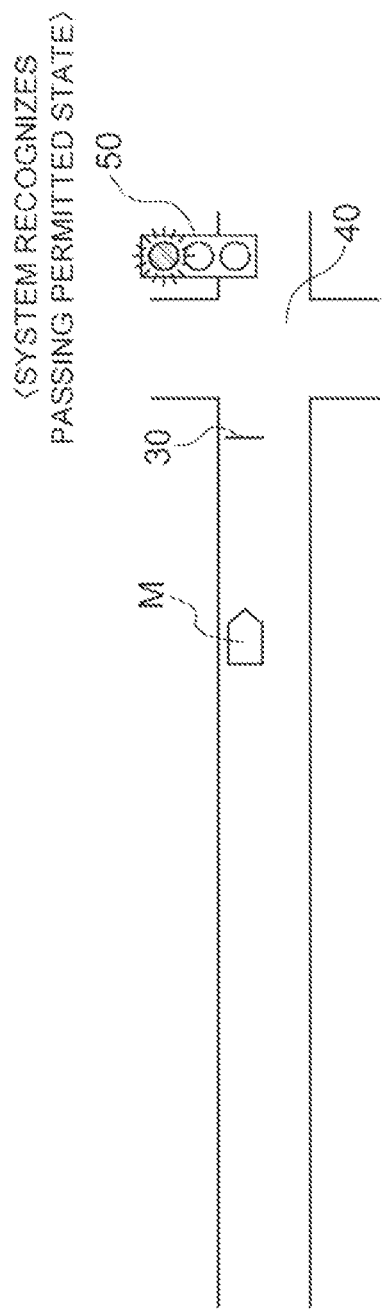
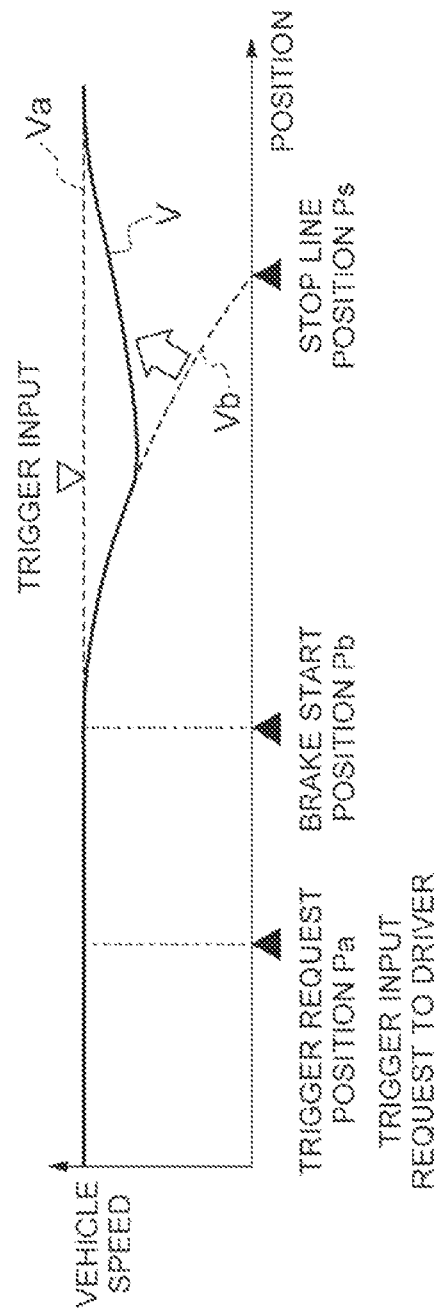
Fig.5A
Fig.5B

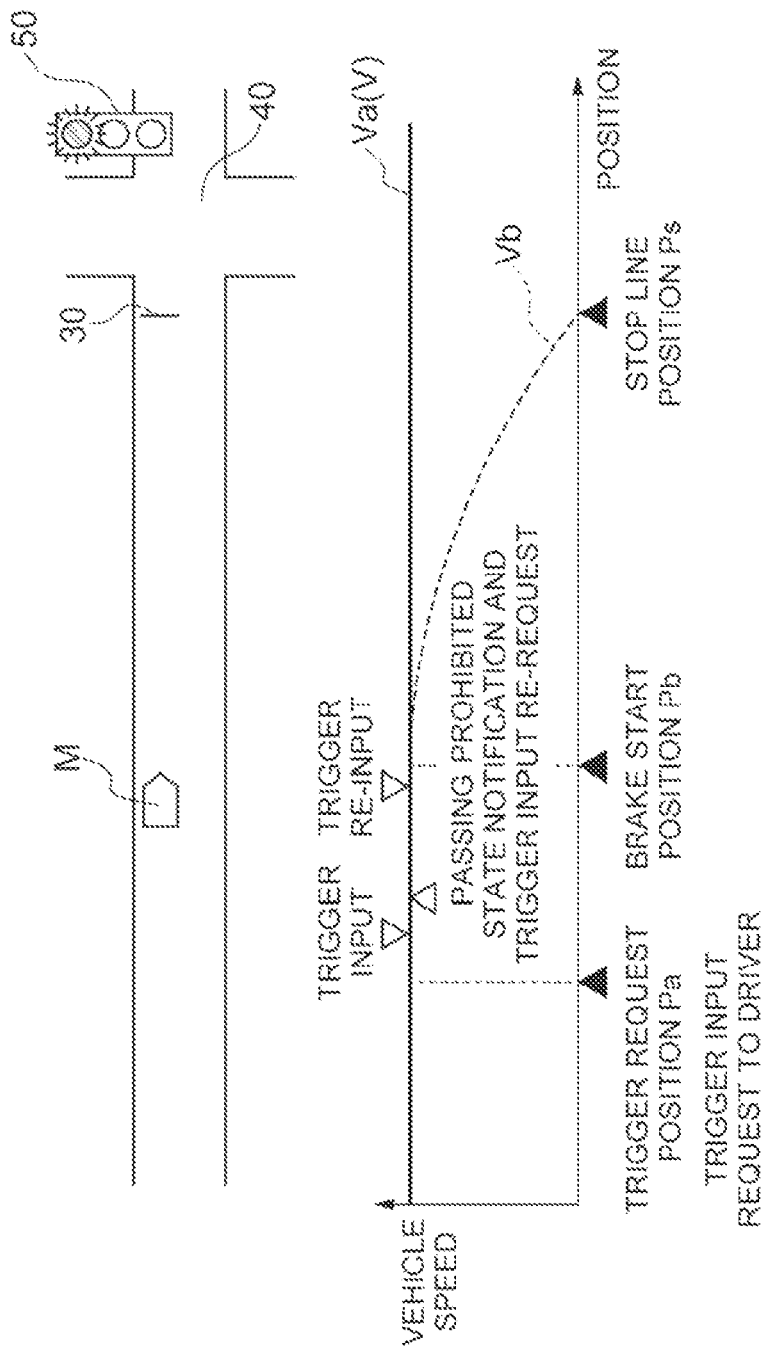

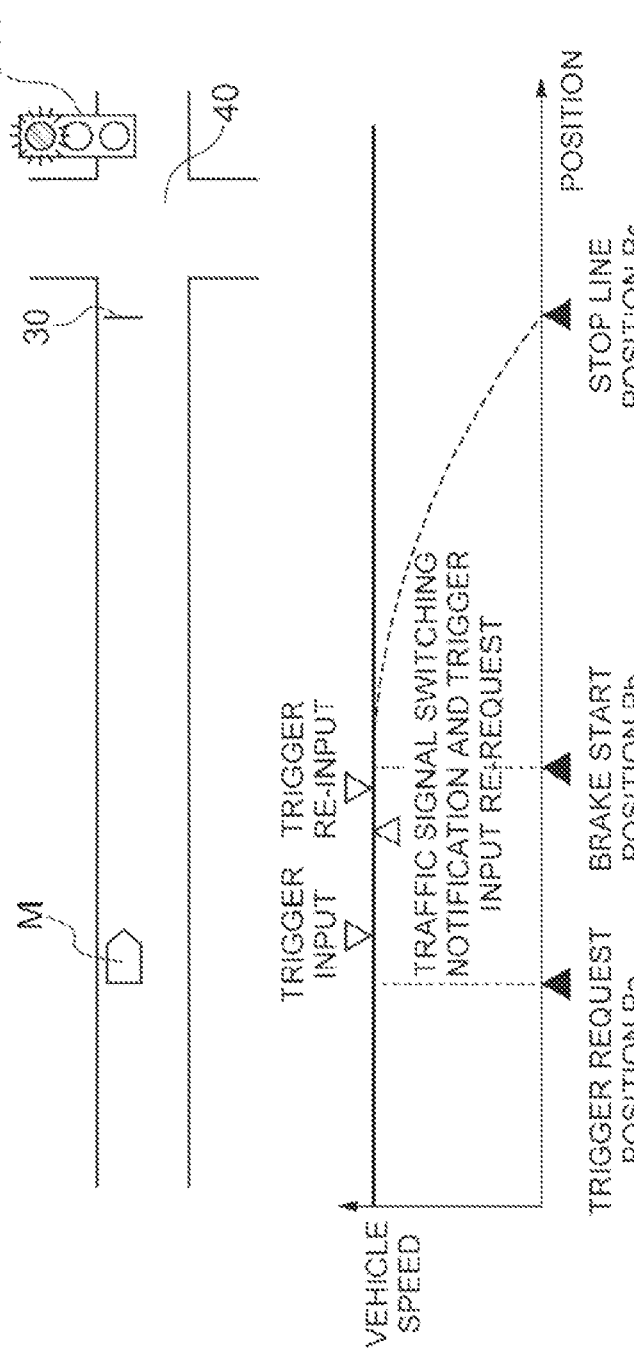

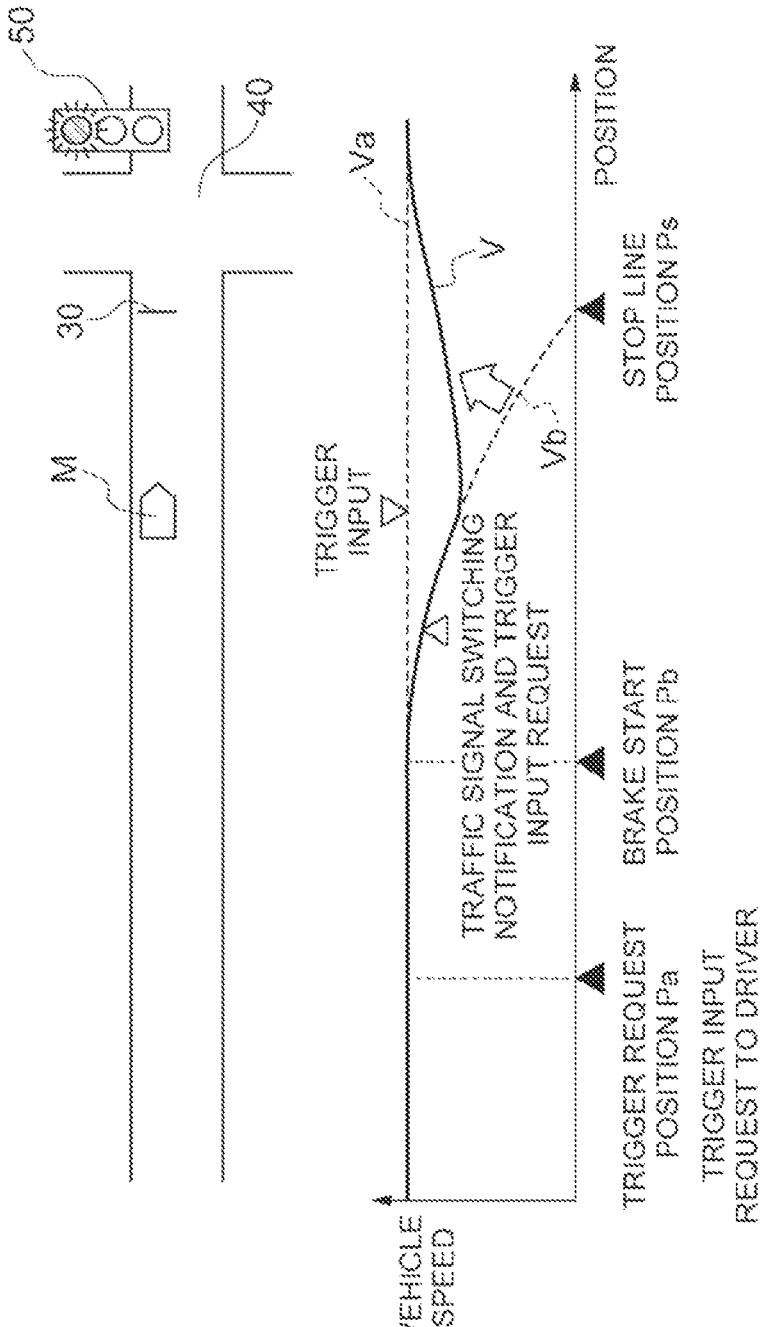

AUTONOMOUS DRIVING SYSTEM AND CONTROL METHOD OF AUTONOMOUS DRIVING SYSTEM

CROSS-REFERENCE TO RELATED APPLICATION

This application is a continuation of U.S. application Ser. No. 16/397,447 filed Apr. 29, 2019, now U.S. Pat. No. 11,492,000 issued on Nov. 8, 2022, which claims the benefit of priority from Japanese Patent Application No. 2018-100893, filed May 25, 2018. The entire disclosures of the prior applications are considered part of the disclosure of the accompanying continuation application, and are hereby incorporated by reference.

TECHNICAL FIELD

The present disclosure relates to an autonomous driving system and a control method of the autonomous driving system.

BACKGROUND

In the related art, Japanese Unexamined Patent Publication No. 2016-24572 is known as a technical literature relating to an autonomous driving system. This publication discloses that, in a traffic signal recognition used for the autonomous driving, for a traffic signal existing in front of a vehicle, the traffic signal is detected from a position where a vehicle can stop.

SUMMARY

Incidentally, it is not easy to maintain perfect accuracy of traffic signal recognition or the like in the autonomous driving. Therefore, it is desirable to obtain a driver's decision at an appropriate position even during the autonomous driving.

According to an aspect of the present disclosure, there is provided an autonomous driving system configured to perform an autonomous driving of a vehicle, the system includes a trigger input request unit configured to perform a trigger input request for requesting a driver of the vehicle to perform a trigger input for causing the vehicle to pass through a target point if the autonomously driving vehicle approaches the target point set in advance and positioned on a traveling route of the vehicle, a trigger input detection unit configured to detect the driver's trigger input, and a vehicle control unit configured to cause the vehicle to pass through the target point if the trigger input is detected, and causes the vehicle to decelerate and stop without passing through the target point if the trigger input is not detected.

According to an autonomous driving system of the aspect of the present disclosure, if the autonomously driving vehicle approaches the target point such as an intersection, the driver is requested to perform the trigger input for the vehicle to pass through the target point, and the vehicle is caused to pass through the target point if the trigger input is detected, and the vehicle is caused to decelerate and stop at the target point without passing through the target point if trigger input is not detected. Therefore, in the autonomous driving system, it is possible to cause the vehicle to pass through the target point after obtaining the driver's decision whether or not to pass through the target point.

In the autonomous driving system of the aspect of the present disclosure, the vehicle control unit may be configured to cause the vehicle to pass through the target point without performing the deceleration of the vehicle if the trigger input is detected before starting the deceleration of the vehicle for causing the vehicle to stop without passing through the target point.

In the autonomous driving system of the aspect of the present disclosure, the vehicle control unit may be configured to cause the vehicle to stop the deceleration and to pass through the target point if the trigger input is detected after starting the deceleration of the vehicle for causing the vehicle to stop without passing through the target point.

In the autonomous driving system of the aspect of the present disclosure, the system may include a traffic signal recognition unit configured to recognize a lighting state of a traffic signal which is located in the target point and is corresponding to the traveling route of the vehicle. The trigger input request unit may be configured to notify the driver that the traffic signal is recognized as not being in a passing permitted state and to perform a trigger input re-request if the traffic signal is recognized as not being in the passing permitted state and the trigger input is detected. The vehicle control unit may be configured to cause the vehicle to pass through the target point if the trigger input is detected after the trigger input re-request, and may be configured to cause the autonomously driving vehicle to decelerate and stop without passing through the target point if the trigger input is not detected after the trigger input re-request.

In the autonomous driving system of the aspect of the present disclosure, the trigger input request unit may be configured to notify the driver that the switching of the traffic signal to a state other than the passing permitted state is recognized and to perform the trigger input re-request if the switching of the traffic signal to the state other than the passing permitted state is recognized after the trigger input is detected. The vehicle control unit may be configured to cause the vehicle to pass through the target point if the trigger input is detected after the trigger input re-request, and may be configured to cause the autonomously driving vehicle to decelerate and stop without passing through the target point if the trigger input is not detected after the trigger input re-request.

In the autonomous driving system of the aspect of the present disclosure, the trigger input detection unit may be configured to detect at least two inputs as the trigger input among an input by a driver's manual operation to a trigger input unit provided in the vehicle, an input by a driver's acceleration operation to an accelerator pedal of the vehicle, and an input by a driver's contact to a touch sensor of the vehicle. In the trigger input re-request, the trigger input request unit may be configured to request the driver to perform an input of which the type is different from that of the trigger input before the re-request.

According to another aspect of the present disclosure, there is provided a control method of an autonomous driving system that performs an autonomous driving of a vehicle, the method includes: requesting a driver of the vehicle to perform a trigger input for causing the vehicle to pass through a target point if the autonomously driving vehicle approaches the target point set in advance; detecting the driver's trigger input; and controlling the autonomously driving vehicle to pass through the target point if the trigger input is detected, and to decelerate and stop without passing through the target point if the trigger input is not detected.

According to the control method of the autonomous driving system in another aspect of the present disclosure, if the autonomously driving vehicle approaches the target point such as an intersection, the driver is requested to perform the trigger input for the vehicle to pass through the target point, and the vehicle is caused to pass through the target point when the trigger input is detected, and the vehicle is caused to decelerate and stop at the target point without passing through the target point when trigger input is not detected. Therefore, in the control method of the autonomous driving system, it is possible to cause the vehicle to pass through the target point after obtaining the driver's decision whether or not to pass through the target point.

In the control method of the autonomous driving system in another aspect of the present disclosure, in the step of controlling the vehicle, the vehicle may be caused to pass through the target point without performing a deceleration of the vehicle if the trigger input is detected before starting the deceleration of the vehicle for causing the vehicle to stop without passing through the target point.

In the control method of the autonomous driving system in another aspect of the present disclosure, in the step of controlling the vehicle, the vehicle may be caused to stop the deceleration and to pass through the target point if the trigger input is detected after starting the deceleration of the vehicle for causing the vehicle to stop without passing through the target point.

The control method of the autonomous driving system in another aspect of the present disclosure may further include: recognizing a lighting state of a traffic signal which is located in the target point and is corresponding to a traveling route of the vehicle; and first re-requesting for notifying the driver that the traffic signal is recognized as not being in a passing permitted state and performing a trigger input re-request if the traffic signal is recognized as not being in the passing permitted state and the trigger input is detected. In the step of controlling the vehicle, the vehicle may be caused to pass through the target point if the trigger input is detected after the trigger input re-request, and the autonomously driving vehicle may be caused to decelerate and stop without passing through the target point if the trigger input is not detected after the trigger input re-request.

The control method of the autonomous driving system in another aspect of the present disclosure may further include: second re-requesting for notifying the driver that the switching of the traffic signal to a state other than the passing permitted state is recognized and performing the trigger input re-request if the switching of the traffic signal to the state other than the passing permitted state is recognized after the trigger input is detected. In the step of controlling the vehicle, the vehicle may be caused to pass through the target point if the trigger input is detected after the trigger input re-request, and the autonomously driving vehicle may be caused to decelerate and stop without passing through the target point if the trigger input is not detected after the trigger input re-request.

In the control method of the autonomous driving system in another aspect of the present disclosure, in the step of detecting the trigger input, at least two inputs may be detected as the trigger input, among an input by a driver's manual operation to a trigger input unit provided in the vehicle, an input by a driver's acceleration operation to an accelerator pedal of the vehicle, and an input by a driver's contact to a touch sensor of the vehicle. In the step of requesting the trigger input, in the trigger input re-request, the driver may be requested to perform an input of which the type is different from that of the trigger input before the re-request.

As described above, according to the autonomous driving system in an aspect of the present disclosure and the control method of the autonomous driving system in another aspect of the present disclosure, it is possible to cause the vehicle to pass through the target point after obtaining the driver's decision whether or not to pass through the target point.

BRIEF DESCRIPTION OF THE DRAWINGS

FIG. 2A is a plan view illustrating a situation in which a vehicle approaches an intersection where a traffic signal is in a passing permitted state.

FIG. 2B is a graph illustrating a vehicle speed profile when a trigger input is detected.

FIG. 4A is a plan view illustrating a situation in which the vehicle approaches the intersection where the traffic signal is in the passing permitted state.

FIG. 4B is a graph illustrating a vehicle speed profile when a trigger cancellation is detected after the trigger input.

FIG. 5A is a plan view illustrating a situation in which the vehicle approaches the intersection where the traffic signal is in the passing permitted state.

FIG. 5B is a graph illustrating a vehicle speed profile if the trigger input is detected after deceleration of the vehicle starts.

FIG. 7A is a plan view illustrating a situation where the vehicle approaching the intersection where the traffic signal is in the passing permitted state.

FIG. 7B is a graph illustrating a vehicle speed profile when a trigger input is detected after the trigger input re-request is performed.

FIG. 8A is a plan view illustrating a situation in which the traffic signal is switched to a state other than the passing permitted state while the vehicle approaches the intersection.

FIG. 8B is a graph illustrating a vehicle speed profile if the trigger input is detected after the trigger input re-request is performed due to switching of the traffic signal.

FIG. 9A is a plan view illustrating a situation in which the traffic signal is switched to the passing permitted state while the vehicle approaches the intersection.

FIG. 9B is a graph illustrating a vehicle speed profile when a first trigger input is detected after a notification of switching the traffic signal to the passing permitted state after the deceleration of the vehicle starts while the trigger input is not detected.

DETAILED DESCRIPTION

Hereinafter, embodiments of the present disclosure will be described with reference to the drawings.

Figure 1:
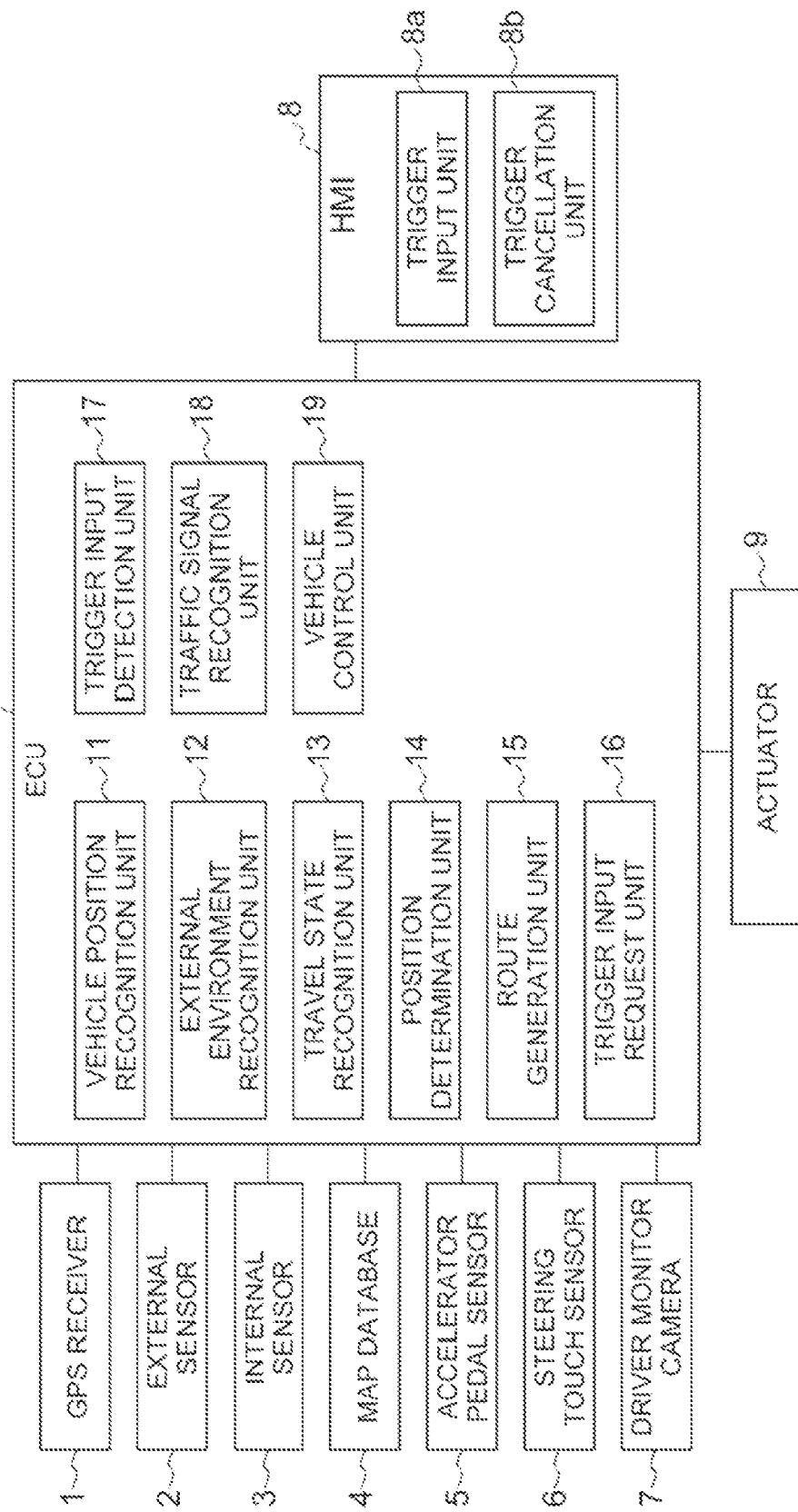
FIG. 1 is a block diagram illustrating an autonomous driving system according to an embodiment.

FIG. 1 is a block diagram illustrating an autonomous driving system according to an embodiment. An autonomous driving system 100 illustrated in FIG. 1 is mounted on a vehicle such as a passenger car, and performs an autonomous driving of the vehicle. The autonomous driving system 100 starts the autonomous driving of the vehicle when a start operation (such as pressing a start button for starting the autonomous driving, voice input, or the like) for the autonomous driving is performed by the occupant. The autonomous driving is a vehicle control that causes the vehicle to autonomously travel toward a destination set in advance. In the autonomous driving, the driver does not need to perform a driving operation, and the vehicle travels autonomously.

When the autonomously driving vehicle approaches a target point such as an intersection, the autonomous driving system 100 requests the driver for a trigger input to pass through the target point. The autonomous driving system 100 causes the vehicle to pass through the target point when the trigger input by the driver is detected, and to stop without passing through the target point when the trigger input is not detected. The details of the target point and the trigger input will be described later.

Configuration of Autonomous Driving System

As illustrated in FIG. 1, the autonomous driving system 100 includes an electronic control unit (ECU) 10 that performs overall management of the system. The ECU 10 is an electronic control unit including a central processing unit (CPU), read only memory (ROM), random access memory (RAM), and the like. In the ECU 10, for example, various functions are realized by loading a program stored in the ROM into the RAM and executing the program loaded in the RAM by the CPU. The ECU 10 may be configured with a plurality of electronic units.

The ECU 10 is connected to a GPS receiver 1, an external sensor 2, an internal sensor 3, a map database 4, an accelerator pedal sensor 5, a steering touch sensor 6, a driver monitor camera 7, a human machine interface (HMI) 8, and an actuator 9.

The GPS receiver 1 measures a position of the vehicle (for example, the latitude and longitude of the vehicle) by receiving signals from three or more GPS satellites. The GPS receiver 1 transmits information on the measured position of the vehicle to the ECU 10.

The external sensor 2 is a detection device that detects a surrounding environment of the vehicle. The external sensor 2 includes at least one of a camera and a radar sensor.

The camera is an imaging device that images an external situation of the vehicle. The camera is provided on the inside of a windshield of the vehicle. The camera transmits the imaging information relating to the external situation of the vehicle to the ECU 10. The camera may be a monocular camera or may be a stereo camera.

The radar sensor is a detection device that detects objects around the vehicle using radio waves (for example, millimeter waves) or light. The radar sensor includes, for example, at least one of the millimeter wave radar or a light detection and ranging (LIDAR). The radar sensor transmits the radio wave or light to the surroundings of the vehicle, and detects the objects by receiving radio waves or light reflected from the objects. The radar sensor transmits the detected object information to the ECU 10. The objects include fixed objects such as guard rails and buildings, as well as moving objects such as pedestrians, bicycles, and other vehicles. The external sensor 2 does not necessarily need to include a radar sensor.

The internal sensor 3 is a detection device that detects a traveling state of the vehicle. The internal sensor 3 includes a vehicle speed sensor, an accelerator sensor, and a yaw rate sensor. The vehicle speed sensor is a measuring device that measures a speed of the vehicle. As the vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information to the ECU 10.

The accelerator sensor is a measuring device that measures an acceleration of the vehicle. The accelerator sensor includes, for example, a longitudinal accelerator sensor that measures acceleration in the longitudinal direction of the vehicle and a lateral accelerator sensor that measures a lateral acceleration of the vehicle. The accelerator sensor, for example, transmits the acceleration information of the vehicle to the ECU 10. The yaw rate sensor is a measuring device that measures a yaw rate (rotation angular velocity) around the vertical axis at the center of gravity of the vehicle. As the yaw rate sensor, for example, a Gyro sensor can be used. The yaw rate sensor transmits the measured yaw rate information of the vehicle to the ECU 10.

The map database 4 is a database that stores map information. The map database 4 is formed, for example, in a hard disk drive (HDD) mounted on the vehicle. The map information includes position information on a lane, information on a shape of the lane (for example, a curve, a lane width, or the like), position information on a stop lone, information on position of a merge point and a branch, and information on the position of buildings. The map information also includes speed related information such as a legal speed associated with the position or section on the map. The map information includes position information of marking objects such as utility poles used for vehicle position recognition. The map database 4 may be stored in a server such as a management center that can communicate with the vehicle.

Data relating to a target point to be described later may be stored in the map database 4 in advance. In the map database 4, for example, data on whether or not a position on the map becomes a candidate for a target point may be stored. The data relating to the target point may be stored in a database different from the map database 4. The data relating to the target point may not be included in the database in the vehicle, and it may be given from the remote data server by the communication function.

The accelerator pedal sensor 5 is a sensor that detects an operation of the accelerator pedal by the driver. The accelerator pedal sensor 5 is provided on the accelerator pedal of the vehicle and measures an amount of operation of the accelerator pedal performed by the driver. The accelerator pedal sensor 5 transmits an accelerator operation signal corresponding to the amount of operation of the accelerator pedal performed by the driver to the ECU 10.

The steering touch sensor 6 is provided on a steering wheel and detects a touch by the driver. For example, a capacitance type touch sensor can be used as the steering touch sensor 6. The steering touch sensor 6 transmits a contact signal to the ECU 10 when the driver touches the steering wheel. The steering touch sensor 6 may be provided on the left and right sides of the steering wheel so as to be able to detect that the driver touches the steering wheel with both hands. In addition, the steering touch sensor 6 may be configured to be capable of detecting a gripping force with which the driver grips the steering wheel.

The driver monitor camera 7 is an imaging device that images the driver of the vehicle. The driver monitor camera 7 is provided, for example, at the position of the front of the driver on the cover of the steering column of the vehicle, and images the driver. A plurality of driver monitor cameras 7 may be provided in order to image the driver from a plurality of directions. The driver monitor camera 7 transmits information of imaging the driver to the ECU 10.

The HMI 8 is a device that performs inputting and outputting of the information between the autonomous driving system 100 and the occupants. The HMI 8 includes, for example, a display, a speaker, and the like. The HMI 8 performs lighting or blinking of a lamp of an instrument panel, image output on the display and audio output from the speaker according to a control signal from the ECU 10. The display may be a head-up display.

The HMI 8 includes various input units for receiving the inputs from the occupants. The HMI 8 may include an autonomous driving start input unit for starting the autonomous driving of the vehicle and an autonomous driving end input unit for ending the autonomous driving. The autonomous driving start input unit and the autonomous driving end input unit may be a button type or a lever type, and are not particularly limited. The input unit may be shared for both the autonomous driving start and the autonomous driving ending. The HMI 8 may have a function of voice recognition (voice input).

The HMI 8 includes a trigger input unit 8*a* for a driver to manually perform a trigger input. The trigger input unit 8*a* may be a button type or a lever type, and is not particularly limited as long as it can be manually operated by the driver. The trigger input unit 8*a* is provided, for example, on any of the instrument panel, the steering column, and on the floor. The trigger input unit 8*a* may also serve as another input unit such as an autonomous driving start input unit.

The HMI 8 includes a trigger cancellation unit 8*b* for the driver to manually perform a trigger cancellation. The trigger cancellation unit 8*b* may be a button type or a lever type, and is not particularly limited as long as it can be manually operated by the driver. The trigger input unit 8*a* is provided, for example, on any of the instrument panel, the steering column, and on the floor. The trigger cancellation unit 8*b* may also serve as another input unit such as an autonomous driving end input unit and may also serve as the trigger input unit 8*a*. For example, the trigger cancellation can be input by pulling down the lever-type trigger input unit 8*a* in the direction different from the case of trigger input. In addition, the trigger cancellation may also be input by long pressing the button-type trigger input unit 8*a* for more than a certain time. Furthermore, the trigger may be input while the driver continues to operate the trigger input unit 8*a* (for example, while continues to press the button-type trigger input unit, or while continues to hold down the lever-type trigger input unit), the trigger may be cancelled by releasing the trigger input unit 8*a*.

The actuator 9 is a device used for controlling the vehicle. The actuator 9 includes at least a throttle actuator, a brake actuator and a steering actuator. The throttle actuator controls a driving force of the vehicle by controlling an amount of air (throttle opening degree) supplied to the engine according to the control signal from the ECU 10. If the vehicle is a hybrid vehicle, in addition to the amount of air supplied to the engine, the control signal from the ECU 10 is input to a motor as a power source, and the driving force of the vehicle is controlled. If the vehicle is an electric vehicle, instead of the throttle actuator, the control signal from the ECU 10 is input to a motor as a power source, and the driving force of the vehicle is controlled. The motor as the power source in these cases configures the actuator 9.

The brake actuator controls the brake system according to the control signal from the ECU 10 and controls a braking force applied to the wheels of the vehicle. For example, a hydraulic brake system can be used as the brake system. The steering actuator controls the driving of an assist motor controlling a steering torque of an electric power steering system according to the control signal from the ECU 10.

Next, a functional configuration of the ECU 10 will be described. The ECU 10 includes a vehicle position recognition unit 11, an external environment recognition unit 12, a travel state recognition unit 13, a position determination unit 14, a route generation unit 15, a trigger input request unit 16, a trigger input detection unit 17, a traffic signal recognition unit 18, and a vehicle control unit 19. A part of the functions of the ECU 10 described above may be performed by a server capable of communicating with the vehicle.

The vehicle position recognition unit 11 recognizes a position of the vehicle on the map based on the position information from the GPS receiver 1 and the map information in the map database 4. In addition, the vehicle position recognition unit 11 recognizes position information of the marking object included in the map information in the map database 4 and performs the vehicle position recognition with high accuracy using the result of detection performed by the external sensor 2 using the simultaneous localization and mapping (SLAM) technology. The vehicle position recognition unit 11 may recognize the position of the vehicle on the map using a known method.

The external environment recognition unit 12 recognizes the external situation around the vehicle based on the result of detection (the object information by the radar sensor and/or the imaging information by the camera) performed by the external sensor 2. The external environment includes a situation of objects around the vehicle. The situation of the object is, for example, a relative position and a relative speed of the object relative to the vehicle. The external environment may include recognition results of lane lines (a lane boundary line, a center line, and the like) around the vehicle. The external environment recognition unit 12 recognizes the relative position of the lane line relative to the vehicle by well-known white line recognition based on the result of detection of the external sensor 2.

The travel state recognition unit 13 recognizes the travel state of the traveling vehicle based on the result of measurement performed by the internal sensor 3. The travel state includes the speed of the vehicle, the acceleration of the vehicle, and the yaw rate of the vehicle. Specifically, the travel state recognition unit 13 recognizes the speed of the vehicle based on the vehicle speed information from the vehicle speed sensor. The travel state recognition unit 13 recognizes the acceleration (a longitudinal acceleration and a lateral acceleration) of the vehicle based on the vehicle speed information from the accelerator sensor. The travel state recognition unit 13 recognizes the direction of the vehicle based on the yaw rate information from the yaw rate sensor.

The position determination unit 14 determines a position relation between the autonomously driving vehicle and the target point. The position determination unit 14 determines the position relation between the autonomously driving vehicle and the target point positioned on the traveling route for the autonomous driving. The traveling route is the route on which the vehicle travels in autonomous driving. Details of the traveling route will be described later.

The target point is a point to which the driver is requested to perform the trigger input before passing through the target point. As an example, the target point includes an intersection. The intersection also includes a circular intersection (roundabout).

The target point may be determined by the relationship between the vehicle and the traveling route of the autonomous driving. The target point may not include the intersection where the vehicle travels straight in the autonomous driving but may include the intersection where the vehicle turns right or left in the autonomous driving. The target point may include a merging point where the vehicle merges into a main lane from a merging lane. The target point may not include a merging point with a good visibility, but may include a merging point with a poor visibility. The merging point with a poor visibility is a merging point where the detection range of the external sensor 2 for the vehicle traveling in the merging lane is blocked more than a certain range by, for example, a wall. Similarly, the target point may not include the intersection with a good visibility, but may include the intersection with a poor visibility where the detection range of the external sensor 2 is blocked more than a certain range by a building or the like around the intersection.

The target point may include a pedestrian cross-walk. The target point may not include the pedestrian cross-walk with good visibility, but may include a pedestrian cross-walk with a poor visibility where the detection range of the external sensor 2 is blocked more than a certain range by a wall or the like in the traveling direction of the vehicle.

The target point may be distinguished between a target point with traffic signal and a target point where there is no traffic signal. The target point where there is a traffic signal means a target point where the traffic signal corresponding to the traveling route of the vehicle is installed. Even if the traffic signal is present at the target point, if the traffic signal does not correspond to the traveling route of the vehicle (for example the traffic signal does not face the vehicle on the traveling route), such a target point is not the target point for the vehicle. The target point may be distinguished between an intersection where there is a traffic signal and an intersection where there is no traffic signal. The target point may not include the intersection where there is no traffic signal and may include the intersection where there is a traffic signal. In addition, the target point may be distinguished between a pedestrian cross-walk where there is a traffic signal and a pedestrian cross-walk where there is no traffic signal. A stop line may be set as the target point.

In addition, the target point may include a point a certain distance before from the intersection, the pedestrian cross-walk, the merging point and the like described above. The target point may include a point where the driver performed an operation of finishing the autonomous driving (such as an override operation) in the past. The target point may include an entry point of a section where a lane width is restricted due to a road construction or the like. In addition, the target point may include a point where there is a step or a dent on the road on which the driver of the vehicle feels a great shaking. The target point may include an entrance gate of a toll road. The target point may include an entry point of a private land.

The position determination unit 14 determines whether or not the distance between the autonomously driving vehicle and the target point is equal to or shorter than a route generation threshold value based on the position of the vehicle on the map, the map information and the traveling route for the autonomous driving. The distance between the autonomously driving vehicle and the target point is a distance between the vehicle and the target point on the traveling route for the autonomous driving. The route generation threshold value is a threshold value set in advance used for starting the generation of a stop route (a vehicle stop speed profile). The details of the stop route will be described later. The route generation threshold value may be changed according to the speed of the vehicle.

The position determination unit 14 determines whether or not the autonomously driving vehicle approaches the target point. For example, when the vehicle reaches a trigger request position set in advance, the position determination unit 14 determines that the vehicle approaches the target point. The trigger request position can be a position where the distance between the autonomously driving vehicle and the target point is equal to or shorter than a trigger request threshold value. The trigger request threshold value is a threshold value set in advance for determining the start of the trigger input request that is for requesting the driver to perform the trigger input. The trigger request threshold value may be set as a different value depending on the target point. When the generation of the stop route using the route generation threshold value is performed, the trigger request threshold value is smaller than the route generation threshold value.

It is not necessary to set the trigger request position, but the position determination unit 14 may determine that the vehicle approaches the target point when the distance between the autonomously driving vehicle and the target point becomes equals to or shorter the trigger request threshold value.

In addition, the position determination unit 14 may determine the approach of the vehicle to the target point using a time to arrival rather than the distance. The position determination unit 14 may determine that the vehicle approaches the target point if the time to arrival in which the vehicle arrives at the target point becomes equal to or shorter than a trigger request time threshold value. The trigger request time threshold value is a threshold value corresponding to the trigger request threshold value described above. The time to arrival can be calculated from, for example, the distance between the vehicle and the target point and the vehicle speed profile (or the current vehicle speed) included in the route for the autonomous driving.

The route generation unit 15 generates a route (trajectory) to be used for the autonomous driving of the vehicle. The route generation unit 15 generates the route for the autonomous driving based on a destination set in advance, the map information in the map database 4, the position of the vehicle recognized by vehicle position recognition unit 11, the external environment of vehicle recognized by external environment recognition unit 12, and the travel state (the vehicle speed, the yaw rate, and the like) recognized by the travel state recognition unit 13. The destination may be set by the occupant of the vehicle or may be the automatically proposed by the autonomous driving system 100 or by the well-known navigation system.

The route generation unit 15 obtains the traveling route for the autonomous driving based on the destination, the map information, and the position of the vehicle on the map. The traveling route is a route on which the vehicle travels in autonomous driving and is a route from the position of the vehicle on the map (the current position) to the destination. The traveling route may be set by a well-known navigation system. The traveling route can be represented as a route on a lane-by-lane basis, for example. The route generation unit 15 generates a route for autonomously driving the vehicle along the traveling route from the map information.

The route includes a path on which the vehicle travels in the autonomous driving and the vehicle speed profile for the autonomous driving. The path is a trajectory on which the autonomously driving vehicle will travel on the traveling route. The path can be data of the steering angle change (a steering angle profile) of the vehicle corresponding to the position on the traveling route, for example. The position on the traveling route is, for example, a set longitudinal position which is set at a predetermined interval (for example, 1 m) in the traveling direction of the traveling route. The steering angle profile is data in which the target steering angle is associated with each set longitudinal position.

The route generation unit 15 generates the path on which the vehicle travels based on, for example, the traveling route, the map information, the external environment of the vehicle, and the traveling state of the vehicle. The route generation unit 15 generates the path such that the vehicle passes through the center of the lane included in the traveling route.

Instead of the steering angle profile, a steering torque profile in which the target steering torque is associated with each set longitudinal position may be used. Instead of the steering angle profile, a lateral position profile in which a target lateral position is associated with each set longitudinal position may be used. The target lateral position is a target position in the width direction of the lane. In this case, the set longitudinal position and the target lateral position may be collectively set as one position coordinate.

The vehicle speed profile is data in which the target vehicle speed is associated with each set longitudinal position, for example. The set longitudinal position may be set based on the travel time of the vehicle instead of the distance. The set longitudinal position may be set as an arrival position of the vehicle after one second and the arrival position of the vehicle after two seconds.

The route generation unit 15 generates the vehicle speed profile based on speed related information such as a legal speed included in, for example, the path and the map information. Instead of the legal speed, a set speed may be used, which is set in advance for the position or the section on the map. The route generation unit 15 generates the route for the autonomous driving from the path and the vehicle speed profile.

The route generation unit 15 generates a passing route for passing through the target point if the target point is included in the traveling route for the autonomous driving. The route generation unit 15 generates the passing route based on, for example, the position of the vehicle on the map, the map information, the external environment of the vehicle, and the traveling state of the vehicle. The passing route includes a passing path and a vehicle passing speed profile. The passing path is a path for causing the vehicle to pass the target point along the traveling route. The vehicle passing speed profile is a vehicle speed profile that causes vehicle to pass the target point at the vehicle speed corresponding to the legal speed or the like at the target point.

If the position determination unit 14 determines that the distance between the autonomously driving vehicle and the target point becomes equal to or shorter than the route generation threshold value, the route generation unit 15 generates a stop route that causes the vehicle to stop without passing through the target point. The route generation unit 15 generates the stop route based on, for example, the position of the vehicle on the map, the map information, the external environment of the vehicle, and the traveling state of the vehicle. The route generation unit 15 generates the stop route according to the target point.

The stop route includes a stop path and a vehicle stop speed profile that causes the vehicle to decelerate and to stop without passing through the target point. The stop path is a path for causing the vehicle to stop without passing through the target point. The stop path may be the same as the passing path. The stop path and the passing path are the same paths, for example, when the autonomously driving vehicle goes straight through the intersection which is the target point. The vehicle stop speed profile is, for example, a vehicle speed profile that causes the vehicle to gradually decelerate and to stop without passing through the target point. In the vehicle stop speed profile, the position at which the deceleration is started for stopping the vehicle is assumed to be a brake start position.

The stop position of the vehicle on the stop route is not particularly limited as long as the position is not a position after the target point. The stop position of the vehicle may be a position before the target point or may be position within the target point (within the intersection, or the like). The stop position of the vehicle can be, for example, a position of the stop line before the target point. The stop position of the vehicle may be set before the target point as much as a set distance on the traveling route. The set distance is a distance set in advance (for example, 1 m).

If the position determination unit 14 determines that the autonomously driving vehicle approaches the target point, the trigger input request unit 16 performs the trigger input request for requesting the driver to perform the trigger input. The trigger input is an input for transferring a driver's decision of causing the vehicle to pass through the target point to the autonomous driving system 100.

The trigger input request unit 16 performs the trigger input request on the driver by transmitting a control signal to the HMI 8 and outputting a voice from the speaker of the HMI 8. For example, if the target point is an intersection where there is a traffic signal, the trigger input request unit 16 performs the trigger input request by causing the speaker to output a voice saying "Please check the traffic signal and perform the trigger input if passing is permitted". The trigger input request unit 16 may perform the trigger input request by outputting an image by a display, or may perform the trigger input request by both the image output and the voice output. Instead of the image output by the display, the lamp or the like of an instrument panel may be turned on or may be blinked.

In addition, the trigger input request unit 16 performs various notifications on the driver according to a result of recognition of the traffic signal performed by the traffic signal recognition unit 18 described later. The trigger input request unit 16 performs the trigger input re-request according to the result of recognition of the traffic signal. Details of the various notifications and trigger input re-request will be described later.

The trigger input detection unit 17 detects the trigger input. If an input is made by the driver's manual operation of the trigger input unit 8a provided in the vehicle (for example, if the button-type trigger input unit 8a is pressed), the trigger input detection unit 17 detects the trigger input.

The trigger input detection unit 17 may be capable of detecting plural types of trigger inputs. That is, the trigger input is not limited to one type, and equal to or more than two types of trigger input may be prepared.

The trigger input detection unit 17 may detect the trigger input if an input is made by the driver's accelerator operation on the accelerator pedal of the vehicle. In this case, the trigger input detection unit 17 detects the trigger input based on the accelerator operation signal from the accelerator pedal sensor 5. The trigger input detection unit 17 detects the trigger input, for example, when it is detected that an amount of operation (amount of depression) on the accelerator pedal by the driver is equal to or larger than a certain amount.

The trigger input detection unit 17 may detect the trigger input when an input is made by the driver's touch on the steering touch sensor 6 of the vehicle. In this case, the trigger input detection unit 17 detects the trigger input based on the contact signal from the steering touch sensor 6.

The trigger input detection unit 17 may be configured to detect the trigger input when, for example, it is detected that the driver's both hands are in contact with the steering wheel after the trigger input request. If the driver's both hands are in contact with the steering wheel before the trigger input request, the trigger input detection unit 17 may detect the trigger input when the driver makes both hands be in contact again with the steering wheel after releasing both hands from the steering wheel after the trigger input request. The trigger input detection unit 17 may detect the trigger input by touching the steering wheel with one hand.

The trigger input detection unit 17 may detect the trigger input from a combination of a plurality of inputs. The trigger input detection unit 17 may detect the trigger input based on, for example, the accelerator operation signal from the accelerator pedal sensor 5, the contact signal from the steering touch sensor 6, and the information of imaging the driver from the driver monitor camera 7. Specifically, the trigger input detection unit 17 may detect the trigger input if the driver turns his/her face toward the front of the vehicle while both hands are in contact with the steering wheel and when the accelerator pedal is operated to equal to or larger than a certain amount.

The trigger input detection unit 17 may detect the trigger input based on the information of imaging the driver from the driver monitor camera 7 and the voice recognition in the HMI 8. If it is detected that a voice corresponding to a predetermined trigger input (for example, a voice for requesting for the vehicle to pass through the target point) is issued after the trigger input request while the driver is looking straight ahead, the trigger input detection unit 17 may detect the trigger input.

The trigger input detection unit 17 may detect the trigger input based on the contact signal from the steering touch sensor 6, the information of imaging the driver from the driver monitor camera 7, and the external environment of the vehicle. Specifically, the trigger input detection unit 17 may detect the trigger input when it is detected from the information of imaging the driver that the driver's line of sight is directed to the traffic signal in front of the vehicle and when it is detected that the driver's both hands hold the steering wheel with equal to or stronger than a certain grasping force.

The trigger input detection unit 17 may detect a driver's braking stance as one of the elements of the combination for detecting the trigger input. The braking stance is a state in which the driver's foot is placed on the brake pedal. The braking stance can be detected by the brake pedal sensor of the vehicle, for example. The trigger input detection unit 17 may detect the trigger input when, for example, the driver is facing the front of the vehicle and both hands are in contact with the steering wheel, and when the braking stance is detected.

The trigger input detection unit 17 detects a trigger cancellation when the driver operates the trigger cancellation unit 8b (for example, when the lever-type trigger cancellation unit 8b is operated). The trigger input detection unit 17 may be capable of detecting plural types of trigger cancellation. The trigger input detection unit 17 may detect the trigger cancelation when it is detected that the amount of operation (amount of depression) of the brake pedal is equal to or larger than a certain amount. The trigger input detection unit 17 may detect the trigger cancellation when the driver slightly presses the autonomous driving end button.

The traffic signal recognition unit 18 detects a lighting state of the traffic signal located in the target point and is corresponding to the traveling route (traveling lane) of the vehicle based on the result of detection (imaging information by the camera) performed by the external sensor 2. The traffic signal recognition unit 18 can recognize the lighting state of the traffic signal from the imaging information by the camera using image analysis processing. The traffic signal recognition unit 18 may detect a lighting portion of the traffic signal using template matching, and then, may recognize the lighting state of the traffic signal using a color recognition. The traffic signal recognition unit 18 may detect the lighting portion of the traffic signal using the template matching, and then, may recognize the lighting state of the "arrow" signal using a pattern recognition. The traffic signal recognition unit 18 may refer to the map information in detecting the position of the traffic signal. Specifically, the traffic signal recognition unit 18 may acquire a position of a candidate of the lighting portion (a valve) of the traffic signal from the map database 4, and then, may recognize the lighting state of the traffic signal using the color recognition. In addition, in detecting the position and/or the lighting portion of the traffic signal, the traffic signal recognition unit 18 may use the object information detected by the radar sensor.

The lighting state of the traffic signal includes at least the passing permitted state and the passing prohibited state. The passing permitted state is a lighting state in which the vehicle is permitted to pass. The passing permitted state corresponds to a green signal in Japan. The passing prohibited state is a lighting state in which the vehicle prohibited to pass. The passing prohibited state corresponds to, for example, a red signal in Japan. The lighting state of the traffic signal may include a transition state which is a state during the transition from the passing permitted state to the passing prohibited state. The transition state corresponds to, for example, a yellow signal in Japan. The lighting state of the traffic signal may include the passing permitted state and the passing prohibited state for a specific traveling direction indicated by an arrow signal. When the vehicle is positioned on the lane corresponding to the arrow signal of the traffic signal, the meaning of lighting state of the traffic signal changes according to the arrow signal.

In addition, the traffic signal recognition unit 18 recognizes the switching of the lighting state of the traffic signal based on the result of detection (imaging information by the camera) performed by the external sensor 2. The traffic signal recognition unit 18 recognizes that the traffic signal is switched from the passing permitted state to the passing permitted state. The traffic signal recognition unit 18 may recognize the lighting state of the traffic signal and the switching of the lighting state of the traffic signal not only by the imaging information by the camera but also through a wireless network connected to the server or the like for managing the traffic information. The traffic signal recognition unit 18 may recognize the lighting state of the traffic signal by referring to a result of recognition of the traffic signal by another vehicle through a vehicle-to-vehicle communication.

The vehicle control unit 19 performs the autonomous driving of the vehicle. The vehicle control unit 19 performs the autonomous driving of the vehicle based on the map information in the map database 4, the position of the vehicle on the map recognized by the vehicle position recognition unit 11, the external environment of the vehicle recognized by the external environment recognition unit 12, the traveling state of the vehicle recognized by the travel state recognition unit 13, and the route generated by the route generation unit 15. The vehicle control unit 19 performs the autonomous driving of the vehicle by transmitting the control signal to the actuator 9.

If the trigger input request unit 16 performs the trigger input request to the driver, and if the driver's trigger input is detected by the trigger input detection unit 17, the vehicle control unit 19 causes the autonomously driving vehicle to pass through the target point. The vehicle control unit 19 causes the vehicle to pass through the target point by autonomous driving along the passing route.

Specifically, if the trigger input request is performed on the driver, the vehicle control unit 19 switches the route of the autonomously driving vehicle to the stop route. When the driver's trigger input is detected, the vehicle control unit 19 returns the route of the autonomously driving vehicle from the stop route to the passing route, and causes the vehicle to pass through the target point.

When the driver's trigger input is detected before the deceleration of the vehicle is started on the stop route, the vehicle control unit 19 causes the vehicle to pass through the target point without performing the deceleration of the vehicle. The deceleration of the vehicle here means the deceleration to cause the vehicle to stop without passing through the target point. The vehicle control unit 19 may perform the deceleration necessary for passing through the target point (for example, deceleration for the right/left turn in the intersection).

If the driver's trigger input is not detected by the trigger input detection unit 17 despite that the trigger input request unit 16 performed the trigger input request on the driver, the vehicle control unit 19 decelerates and stops the autonomously driving vehicle without passing through the target point.

The case where the trigger input is not detected means a case where, for example, the trigger input is not detected until the vehicle reaches the brake start position on the stop route. The case where the trigger input is not detected may be a case where the trigger input is not detected while the vehicle travels a certain distance set in advance after the trigger input request is performed. Alternatively, the case where the trigger input is not detected may be a case where the trigger input is not detected within a certain time set in advance after the trigger input request is performed.

Specifically, when the trigger input request is performed on the driver, the vehicle control unit 19 switches the route of the autonomously driving vehicle to the stop route. When the vehicle reaches the brake start position on the stop route while the trigger input is not detected, the vehicle control unit 19 notifies the driver of the start of deceleration of the vehicle (deceleration start notification) and causes the vehicle to decelerate and stop without passing through the target point. For example, the vehicle control unit 19 causes the vehicle to stop at the position of the stop line before the passing point without passing through the target point. Hereinafter, the function of controlling the vehicle according to the trigger input will be described with reference to the drawings.

Basic Function for Target Point Where There is Traffic Signal

FIG. 2A is a plan view illustrating a situation in which a vehicle approaches an intersection where a traffic signal is in a passing permitted state. In FIG. 2A, the vehicle has a traveling route for going straight through the intersection. In FIG. 2A, an autonomously driving vehicle M, a stop line 30, an intersection 40, and a traffic signal 50 are illustrated.

The stop line 30 is a stop line corresponding to the intersection 40 on the traveling route for the autonomous driving of the vehicle M. The intersection 40 is a target point where there is a traffic signal positioned on the traveling route for the autonomous driving of the vehicle M.

The traffic signal 50 is a traffic signal installed in the intersection 40 and is corresponding to the traveling route of the vehicle M. In FIG. 2A, the traffic signal 50 is in the passing permitted state, and the autonomous driving system 100 (the traffic signal recognition unit 18) also recognizes the passing permitted state.

FIG. 2B is a graph illustrating a vehicle speed profile when the trigger input is detected. In FIG. 2B, the vertical axis represents the vehicle speed and the horizontal axis represents the position. In FIG. 2B, a trigger request position Pa, a brake start position Pb, a stop line position Ps, a vehicle passing speed profile Va, and a vehicle stop speed profile Vb are illustrated. In addition, the vehicle speed when the vehicle M actually travels is indicated as V.

The trigger request position Pa is a position at which it is determined by the position determination unit 14 that the vehicle M approaches the intersection 40. The brake start position Pb is a position at which the deceleration of the vehicle M is started on the stop route for causing the vehicle M to stop without passing through the intersection 40. The stop line position Ps is a position on the stop line 30 and the position where the vehicle M stops on the stop route.

The vehicle passing speed profile Va is a vehicle speed profile for causing the autonomously driving vehicle M to pass through the intersection 40. As an example, the vehicle passing speed profile Va is a vehicle speed profile for passing through the intersection 40 at a constant speed. The vehicle stop speed profile Vb is a vehicle speed profile for causing the autonomously driving vehicle M to decelerate and stop at the stop line position Ps before the intersection 40. The vehicle passing speed profile Va and the vehicle stop speed profile Vb are the same until the vehicle M reaches the brake start position Pb. In FIG. 2A, the passing path and the stop path are assumed to be the same.

In the situation illustrated in FIG. 2A and FIG. 2B, in the autonomous driving system 100, when the vehicle M reaches the trigger request position Pa, the position determination unit 14 determines that the vehicle M approaches the intersection 40, and the trigger input request unit 16 performs the trigger input request on the driver. When the trigger input request is performed, the vehicle control unit 19 starts the autonomous driving along the vehicle stop speed profile Vb (stop route).

Thereafter, since the driver's trigger input is detected by the trigger input detection unit 17 before the vehicle M reaches the brake start position Pb, the vehicle control unit 19 returns the driving to the vehicle passing speed profile Va (passing route). The vehicle control unit 19 causes the vehicle M to pass through the target point along the vehicle passing speed profile Va. The vehicle speed V of the vehicle M is coincident with the vehicle passing speed profile Va.

Figures 3A, 3B:
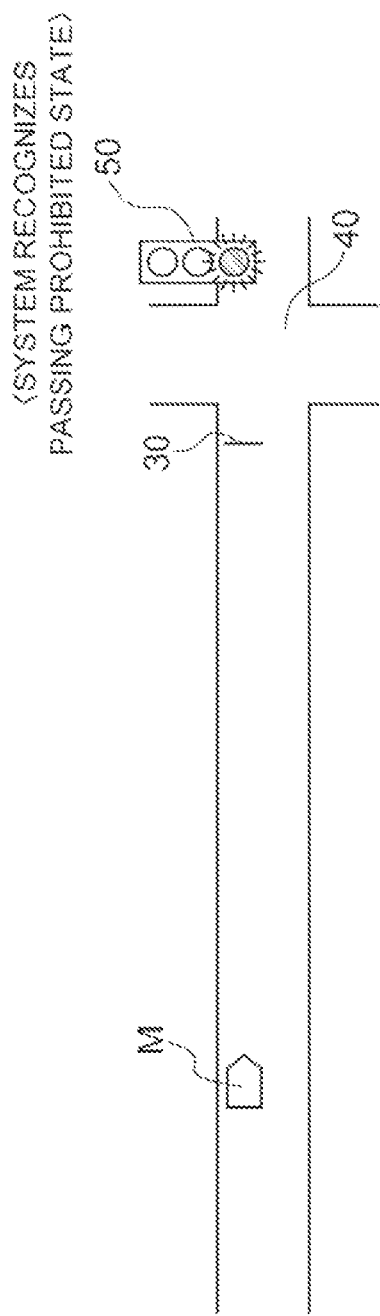
FIG. 3A is a plan view illustrating a situation in which the vehicle approaches the intersection where the traffic signal is in a passing prohibited state.
FIG. 3B is a graph illustrating a vehicle speed profile when the trigger input is not detected.

FIG. 3A is a plan view illustrating a situation in which the vehicle approaches the intersection where the traffic signal is in the passing prohibited state. In FIG. 3A, the traffic signal 50 is in the passing prohibited state, and the autonomous driving system 100 also recognizes the passing prohibited state. FIG. 3B is a graph illustrating the vehicle speed profile when the trigger input is not detected. Hereinafter, the same reference numerals are given to the same configuration elements, and the description thereof will not be repeated.

In the situation illustrated in FIG. 3A and FIG. 3B, in the autonomous driving system 100, the trigger input is not detected after the trigger input request is performed on the driver. In this case, the vehicle control unit 19 causes the vehicle M to performs autonomous driving along the vehicle stop speed profile Vb (stop route). If the vehicle M reaches the brake start position Pb, the vehicle control unit 19 starts the deceleration of the vehicle M according to the vehicle stop speed profile Vb. Thereafter, the vehicle control unit 19 stops the decelerated vehicle M at the stop line position Ps according to the vehicle stop speed profile Vb. The vehicle speed V of the vehicle M in this case coincides with the vehicle stop speed profile Vb.

Trigger Cancellation Function

Even if the trigger input by the driver is detected, the vehicle control unit 19 cancels the trigger input when the trigger cancellation by the driver is detected by the trigger input detection unit 17.

Specifically, when the trigger cancelation is detected, the vehicle control unit 19 determines whether or not the vehicle can stop in time, based on the position of the vehicle on the map, the stop position of the vehicle on the stop route, and the traveling state of the vehicle. To stop the vehicle in time means that the vehicle can stop at the scheduled stop position on the stop route at the deceleration equal to or lower than the allowable deceleration. The allowable deceleration is a deceleration set in advance. The allowable deceleration can be set as an upper limit of the deceleration which is an unnatural sudden braking from the viewpoint of traffic flow, for example. The vehicle control unit 19 determines that the vehicle can stop in time if the vehicle does not reach the brake start position on the stop route.

If it is determined that the vehicle can stop in time, the vehicle control unit 19 cancels the trigger input. Thereafter, when the trigger input is not detected, the vehicle control unit 19 causes the vehicle to decelerate along the stop route and to stop without passing through the target point.

Even if the vehicle travels along the passing route and exceeds the brake start position after the trigger input is detected, when the trigger cancellation is detected and it is determined that the vehicle can stop in time, the vehicle control unit 19 shifts the route from the passing route to the stop route. The vehicle control unit 19 shifts the vehicle speed from the vehicle passing speed profile Va to the vehicle stop speed profile Vb such that the vehicle speed V changes smoothly.

If it is determined that the vehicle cannot stop in time, the vehicle control unit 19 notifies the driver that the trigger cancellation is not possible. The vehicle control unit 19 notifies that the trigger cancellation is not possible by transmitting the control signal to the HMI 8 and outputting a voice and/or an image. Instead of the image output by the display, the lamp or the like of the instrument panel may be turned on or blinked. In this case, the vehicle control unit 19 may decelerate or accelerate the vehicle M according to the external environment.

FIG. 4A is a plan view illustrating a situation in which the vehicle approaches the intersection where the traffic signal is in the passing permitted state. In FIG. 4A, the traffic signal 50 is in the passing permitted state, and the autonomous driving system 100 also recognizes the passing permitted state. FIG. 4B is a graph illustrating the vehicle speed profile when the trigger cancellation is detected after the trigger input.

In FIG. 4A and FIG. 4B, in the autonomous driving system 100, the trigger input is detected after the trigger input request was performed on the driver, but thereafter the trigger cancellation is detected. In this case, since the trigger cancellation is detected before the vehicle M reaches the brake start position Pb, the vehicle control unit 19 determines that the vehicle M can stop in time.

The vehicle control unit 19 shifts the route from the passing route to the stop route, and causes the vehicle M to decelerate along the vehicle stop speed profile Vb and to stop at the stop line position Ps. In this case, the vehicle speed V of the vehicle M coincides with the vehicle stop speed profile Vb. The trigger cancellation can also be performed for trigger input re-request (trigger input after the re-request of the trigger input) which will be described later.

Returning Function by Trigger Input after Starting Deceleration

Even if the deceleration of the vehicle along the stop route is started, when the trigger input is detected, the vehicle control unit 19 stops the deceleration on the stop route and causes the vehicle to pass through the target point. That is, the vehicle control unit 19 returns from the stop route to the passing route. The vehicle control unit 19 performs the returning from the passing route to the stop route such that the vehicle speed changes smoothly.

FIG. 5A is a plan view illustrating a situation in which the vehicle approaches the intersection where the traffic signal is in the passing permitted state. In FIG. 5A, the traffic signal 50 is in the passing permitted state, and the autonomous driving system 100 also recognizes the passing permitted state. FIG. 5B is a graph illustrating the vehicle speed profile if the trigger input is detected the after deceleration of the vehicle starts.

In the situation illustrated in FIG. 5A and FIG. 5B, in the autonomous driving system 100, the trigger input is not detected until the vehicle M reaches the brake start position Pb, and the deceleration of the vehicle M starts along the stop route. In this case, the vehicle control unit 19 performs the autonomous driving such that the speed returns to the vehicle passing speed profile Va from the vehicle stop speed profile Vb. The vehicle control unit 19 controls the vehicle M such that the vehicle speed V changes smoothly from the vehicle stop speed profile Vb to the vehicle passing speed profile Va.

Re-Request Function when Traffic Signal is not Recognized as Passing Permitted State Even if the trigger input by the driver is detected, when the traffic signal recognition unit 18 recognizes that the traffic signal is not in the passing permitted state, the trigger input request unit 16 notifies the driver that the traffic signal is recognized as not being in the passing permitted state, and performs the trigger input re-request.

If the traffic signal is recognized as being in the passing prohibited state rather than in the passing permitted state, as a notification that the traffic signal is recognized as not being in the passing permitted state, the trigger input request unit 16 performs a passing prohibited state recognition notification to notify that the traffic signal is in the passing prohibited state. If the traffic signal is recognized as being in the transition state rather than in the passing permitted state, as a notification that the traffic signal is recognized as not being in the passing permitted state, the trigger input request unit 16 performs a transition state recognition notification to notify that the traffic signal is in the transition state.

The trigger input request unit 16 performs the notification and re-request on the driver by transmitting a control signal to the HMI 8 and outputting a voice from the speaker of the HMI 8. For example, the trigger input request unit 16 notifies the driver that the traffic signal is recognized as not the passing permitted state by outputting a voice saying "a red signal (passing prohibited state) is recognized". In addition, the trigger input request unit 16 performs the trigger input re-request on the driver by, for example, outputting a voice saying "Please check the traffic signal and re-input the trigger input if you want the vehicle to pass".

In addition, in the trigger input re-request, the trigger input request unit 16 requests the driver to perform an input of which the type is different from that of the trigger input before re-request. The trigger input request unit 16 requests the driver to perform an input of which the type is different from that of the trigger input before re-request among the trigger input by operation of the trigger input unit 8a, the trigger input by the operation of the accelerator pedal, the trigger input by touching the steering touch sensor 6, and other trigger input such as the combinations of above-described trigger inputs. If the input type requested to the driver is performed in the trigger input re-request by the trigger input request unit 16, the trigger input detection unit 17 detects the trigger input.

The trigger input request unit 16 may request the trigger input as the re-request, in which the intention of the driver to input the trigger is clear compared to the trigger input before the re-request. If the trigger input before the re-request is the operation of the accelerator pedal larger than a certain amount, the trigger input request unit 16 may request the trigger input by manually operating the lever-type trigger input unit 8a as the trigger input re-request. The trigger input request unit 16 requests the driver to perform the trigger input of which the type is different from that of the trigger input before the re-request by outputting a voice saying "Please perform the re-input of the trigger by operating the lever-type trigger input unit".

For example, if the trigger input before the re-request is a trigger input by one input, the trigger input request unit 16 may request the driver to perform a trigger input requiring multiple inputs as the trigger input re-request, in which the intention of the driver to input the trigger is clear.

In addition, for example, if the trigger input before the re-request is the trigger input by touching the steering touch sensor 6 by the driver's both hands, as the trigger input request, the trigger input request unit 16 may request the driver to perform the trigger input to operate the accelerator pedal equal to or larger than a certain amount in the state in which the driver's both hands are in contact with the steering touch sensor 6. In this way, the trigger input request unit 16 can more reliably recognize the driver's decision by requesting the operation that makes the driver's intention of trigger input clearer as the trigger input re-request.

The trigger input request unit 16 may perform the notification or the trigger input re-request by outputting the images by the display, or may perform the notification or the trigger input re-request by both the image output and the audio output. Instead of the image output by the display, the lamp or the like of the instrument panel may be turned on or blinked. In addition, the trigger input request unit 16 may perform the trigger input re-request using the vibration of the steering wheel and/or the driver's seat as well.

Even if the trigger input by the driver is detected, if the traffic signal recognition unit 18 recognizes that the traffic signal is in the passing prohibited state, the vehicle control unit 19 causes the vehicle to keep the stop route. If the trigger input is detected after the trigger input re-request is performed by the trigger input request unit 16, the vehicle control unit 19 shifts the route from the stop route to the passing route and causes the vehicle to pass through the target point.

Figures 6A, 6B:
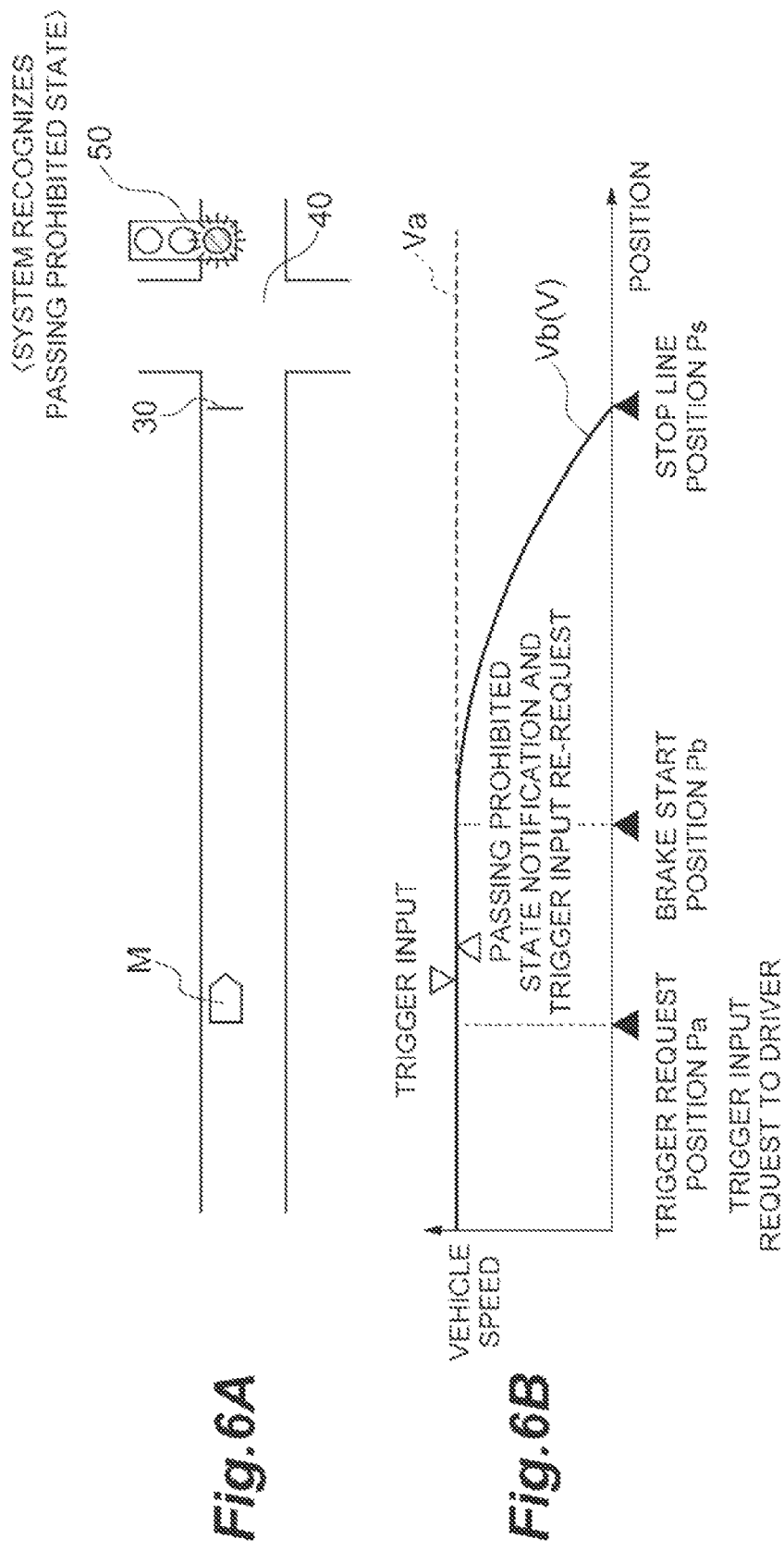
FIG. 6A is a plan view illustrating a situation in which the vehicle approaches the intersection where the traffic signal is in the passing prohibited state.
FIG. 6B is a graph illustrating the vehicle speed profile when the trigger input re-request is performed after the trigger input.

FIG. 6A is a plan view illustrating a situation in which the vehicle approaches the intersection where the traffic signal is the passing prohibited state. In FIG. 6A, the traffic signal 50 is in the passing prohibited state, and the autonomous driving system 100 also recognizes the passing prohibited state. FIG. 6B is a graph illustrating the vehicle speed profile when the trigger input re-request is performed after the trigger input.

In the situation illustrated in FIG. 6A and FIG. 6B, in the autonomous driving system 100, the trigger input by the driver is detected, but since the traffic signal 50 is recognized as the passing prohibited state by the traffic signal recognition unit 18, the notification that the traffic signal 50 is not in the passing permitted state (the passing prohibited state recognition notification) and the trigger input re-request is performed is performed on the driver. The driver receives the passing prohibited state recognition notification, and confirms that the traffic signal 50 is in the passing prohibited state, and then, determines to cause the vehicle M to stop. Since the trigger input by the driver is not detected after the trigger input re-request, the vehicle control unit 19 causes the vehicle M to decelerate along the vehicle stop speed profile Vb and to stop at the stop line position Ps.

FIG. 7A is a plan view illustrating a situation where the vehicle approaching the intersection where the traffic signal is in the passing permitted state. In FIG. 7A, although the traffic signal 50 is in the passing permitted state, but the autonomous driving system 100 erroneously recognizes that the traffic signal 50 is in the passing prohibited state due to the influence of the backlight or the like. FIG. 7B is a graph illustrating a vehicle speed profile if the trigger input is detected after the trigger input re-request is performed.

In the situation illustrated in FIG. 7A and FIG. 7B, in the autonomous driving system 100, since the trigger input by the driver is detected but the traffic signal 50 is erroneously recognized as the passing prohibited state by the traffic signal recognition unit 18, the passing prohibited state recognition notification and the trigger input re-request are performed on the driver. In this case, the driver by receives the passing prohibited state recognition notification and checks the traffic signal 50, but determines that the traffic signal 50 is in the passing permitted state and the recognition of the autonomous driving system 100 is incorrect. The driver performs the re-input of the trigger according to the trigger input re-request for causing the vehicle M to pass the intersection 40. Since the re-input of the trigger input by the driver is detected, the vehicle control unit 19 causes the vehicle M to pass through the intersection 40 along the vehicle passing speed profile Va.

Even if the first trigger input is not detected and the vehicle M reaches the brake start position Pb and deceleration of the vehicle M is started, and thereafter the trigger input (the first trigger input) is detected, when the traffic signal 50 is recognized as the passing prohibited state, the vehicle control unit 19 performs the passing prohibited state recognition notification and the trigger input re-request.

In addition, if re-input of the trigger input is not detected after the vehicle re-request, the vehicle M reaches the brake start position Pb, and the deceleration of the vehicle M is started, then if trigger input re-input is detected afterward, the vehicle control unit 19 may perform the same processing as the above-described "returning function by the trigger input after the deceleration starting".

Re-Request Function when Traffic Signal is Recognized as Being Switched to Other than Passing Permitted State Even if the trigger input by the driver is detected, and if the traffic signal recognition unit 18 recognizes that the traffic signal is switched to a state other than the passing permitted state, the trigger input request unit 16 notifies the driver that the traffic signal recognized as being switched to the state other than the passing permitted state, and performs the trigger input re-request.

Switching the traffic signal to a state other than the passing permitted state includes switching the traffic signal state to the transition state or the passing prohibited state. Switching the traffic signal to a state other than the passing permitted state does not include switching the traffic signal from the passing prohibited state to the passing permitted state. Hereinafter, the notification of the recognition that the traffic signal is switched to a state other than the passing permitted state is referred to as a traffic signal switching notification.

Specifically, if the trigger input by the driver is detected and the traffic signal recognition unit 18 recognizes that the traffic signal is switched to a state other than the passing permitted state, the trigger input request unit 16 determines whether or not the vehicle can stop in time. The determination whether or not the vehicle can stop in time can be performed in the same way as in the case of the trigger cancellation function described above. If it is determined that the vehicle cannot stop in time, the trigger input request unit 16 does not need to perform any particular processing. If it is determined that the vehicle can stop in time, the trigger input request unit 16 performs the traffic signal switching notification and the trigger input re-request on the driver.

The trigger input request unit 16 performs the traffic signal switching notification and the re-request on the driver by transmitting a control signal to the HMI 8 and outputting a voice from the speaker of the HMI 8. The trigger input request unit 16 performs the traffic signal switching notification by outputting a voice saying, for example, "traffic signal is changed to the red signal (passing prohibited state)".

In addition, the trigger input request unit 16 performs the trigger input re-request on the driver by, for example, outputting a voice saying "Please check the traffic signal and re-input the trigger input if you want the vehicle to pass". The trigger input re-request, can be performed the same as that in the "Re-request Function when Traffic Signal is recognized as Passing Prohibited State".

The re-input of the trigger input requested when the traffic signal is recognized as being in the passing prohibited state and the re-input of the trigger input requested when the switching of the traffic signal is recognized may be different types. In this case, if the input type requested to the driver is performed in the trigger input re-request by the trigger input request unit 16, the trigger input detection unit 17 detects the trigger input.

Even if the trigger input by the driver is detected, if the traffic signal recognition unit 18 recognizes the switching of the traffic signal to the state other than the passing permitted state, the vehicle control unit 19 causes the vehicle to keep the stop route. If the trigger input is not detected after the trigger input re-request is performed by the trigger input request unit 16, the vehicle control unit 19 causes the vehicle to decelerate along the stop route and to stop without passing through the target point.

If the trigger input is detected before the vehicle reaches a deceleration start position to make the vehicle stop in time after the trigger input re-request is performed, the vehicle control unit 19 shifts the route from the stop route to the passing route and causes the vehicle to pass through the target point. The deceleration start position is a position where the deceleration of the vehicle is required to stop the vehicle at the stop position on the stop route.

FIG. 8A is a plan view illustrating a situation in which the traffic signal is switched to a state other than the passing permitted state while the vehicle approaches the intersection. In FIG. 8A, the traffic signal 50 is in the passing permitted state, but is switched from the passing permitted state to the transition state while the vehicle M is approaching. The autonomous driving system 100 also recognizes the switching of the traffic signal. FIG. 8B is a graph illustrating a vehicle speed profile if the trigger input is detected after the trigger input re-request is performed due to the switching of the traffic signal.

In the situation illustrated in FIG. 8A and FIG. 8B, in the autonomous driving system 100, since the traffic signal recognition unit 18 recognizes that the traffic signal 50 is switched to the transition state after the trigger input by the driver is detected, the traffic signal switching notification and the trigger input re-request are performed on the driver. The driver receives the traffic signal switching notification and confirms that the traffic signal 50 is switched to the transition state. In FIG. 8B, the driver determines that the vehicle M can pass through the intersection 40 before the traffic signal 50 is switched to the passing prohibited state, and thus, performs the re-inputs of the trigger input.

Since the re-input of the trigger input by the driver was detected, the vehicle control unit 19 causes the vehicle M to pass through the intersection 40 according to the vehicle passing speed profile Va. In this case, since the vehicle M is caused to pass through the intersection 40 before the traffic signal 50 is switched to the passing prohibited state, the vehicle control unit 19 may increase the vehicle speed of the vehicle M within a vehicle speed range set in advance.

If the deceleration of the vehicle M is started before the vehicle M reaches the brake start position Pb without the re-input of the trigger input being detected, the vehicle control unit 19 may perform the same processing as that in the above-described "Returning Function by Trigger Input after Starting Deceleration".

In addition, when the re-input of the trigger input is performed after the traffic signal 50 is recognized as being switched from the passing permitted state to the transition state, and thereafter, even if the traffic signal 50 is recognized as being switched from the transition state to the passing prohibited state before the vehicle M passes through the intersection 40, the trigger input request unit 16 may not repeatedly perform the traffic signal switching notification and the trigger input re-request. In this case, after the re-input of trigger input is performed by the driver, even if the traffic signal 50 is recognized as being switched from the transition state to the passing prohibited state and the re-input of the trigger input is not performed, the vehicle control unit 19 may cause the vehicle M to pass through the intersection 40.

Second Request Function When Traffic Signal is Recognized as Being Switched to Passing Permitted State If the traffic signal recognition unit 18 recognizes that the traffic signal is switched to the passing permitted state without the trigger input by the driver being detected after the trigger input request is performed, the trigger input request unit 16 notifies the driver that the switching of the traffic signal to the passing permitted state is recognized and performs a second trigger input request.

A trigger input request that is performed in a state in which the trigger input is not detected after the trigger input request is performed is expressed as the second trigger input request. The trigger input request unit 16 transmits a control signal to, for example, the HMI 8, notifies the driver that the traffic signal is recognized as being switched to the passing permitted state by the voice output from the speaker of the HMI 8, and performs the second trigger input request. The trigger input request unit 16 may perform the notification and the second trigger input request by outputting an image to the display.

FIG. 9A is a plan view illustrating a situation in which the traffic signal is switched to the passing permitted state while the vehicle approaches the intersection. In FIG. 9A, the traffic signal 50 is in the passing prohibited state, but is switched from the passing prohibited state to the passing permitted state while vehicle M approaches the intersection. The autonomous driving system 100 also recognizes the switching of the traffic signal. FIG. 9B is a graph illustrating a vehicle speed profile when a first trigger input is detected after a notification of switching the traffic signal to the passing permitted state after the deceleration of the vehicle starts while the trigger input is not detected.

In the situation illustrated in FIGS. 9A and 9B, in the autonomous driving system 100, the vehicle M reaches the brake start position Pb and deceleration of the vehicle M is started while the trigger input is not detected. Thereafter, since the traffic signal recognition unit 18 recognizes that the traffic signal 50 is switched to the passing permitted state while the trigger input is not detected, the trigger input request unit 16 performs the traffic signal switching notification (notification that the traffic signal 50 is switched to the passing permitted state in this case) and the second trigger input request on the driver.

The driver did not perform the trigger input because, for example, the traffic signal is recognized as being in the passing prohibited state, but after receiving the traffic signal switching notification that the traffic signal is switched to the passing permitted state, and then, confirms that the traffic signal 50 is switched to the passing permitted state and performs the trigger input. The vehicle control unit 19 detects the trigger input by the driver, shifts the route from the stop route to the passing route, and causes the vehicle M to pass through the intersection 40.

Basic Function for Target Point Where There is No Traffic Signal.

Figure 10A:
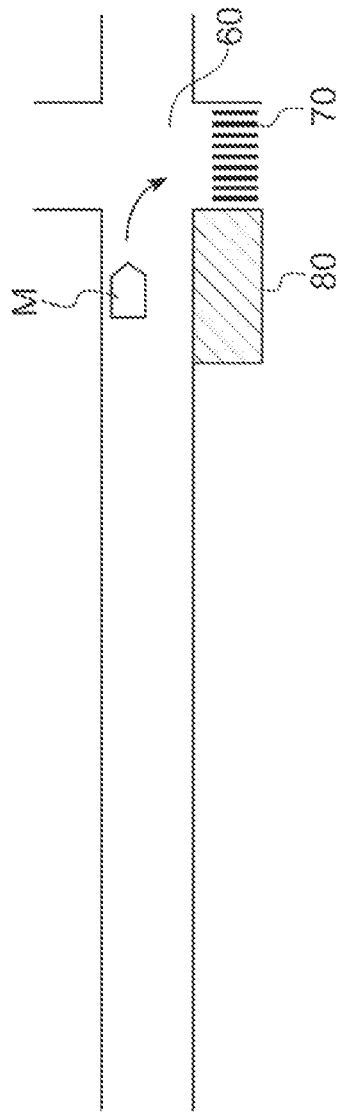
FIG. 10A is a plan view illustrating a situation in which the vehicle attempts to turn right in the intersection where there is no traffic signal.
Figure 10B:
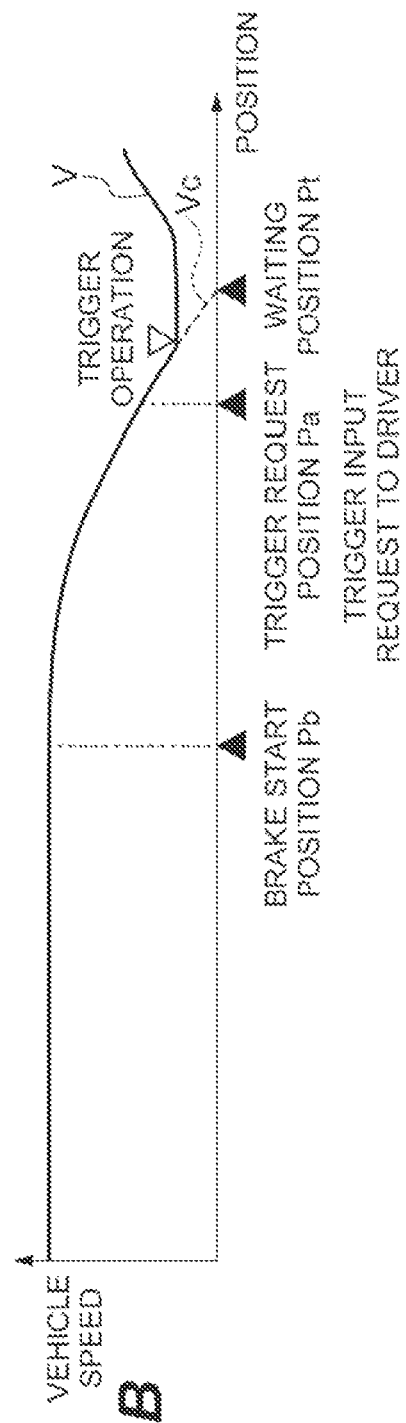
FIG. 10B is a graph illustrating a vehicle speed profile when the trigger input is detected.

FIG. 10A is a plan view illustrating a situation in which the vehicle attempts to turn right in the intersection where there is no traffic signal. In FIG. 10A, an intersection (target point) 60 where there is no traffic signal, a pedestrian cross-walk 70 provided at a destination of the right turn of vehicle M at the intersection 60, a building 80 positioned between the vehicle M and the pedestrian cross-walk 70 before the right turn in the intersection 60. There is no stop line in the intersection 60. FIG. 10B is a graph illustrating a vehicle speed profile when the trigger input is detected.

In the situation illustrated in FIG. 10A and FIG. 10B, autonomous driving system 100, since the detection range of the external sensor 2 is obstructed by the building 80 at the stage before the vehicle M enters the intersection 60, it is not possible to detect the situation at the destination of the right turn in the intersection 60 (the situation such as the presence or absence of pedestrians at the pedestrian cross-walk 70). In this situation, the route generation unit 15 generates a vehicle stop speed profile Vc in which the vehicle M is stopped in the intersection 60. A waiting position Pt in the vehicle stop speed profile Vc is not particularly limited. The waiting position Pt can be a position at which the driver can visually recognize the situation at the destination of the right turn. In this example, the route generation unit 15 does not create a vehicle passing speed profile, but may create a vehicle passing speed profile that makes the vehicle pass through the intersection 60 at a low speed.

In order for the right turn of the vehicle M, the vehicle control unit 19 causes the vehicle M exceeding the brake start position Pb to decelerate the vehicle speed according to the vehicle stop speed profile Vc. The position determination unit 14 determines that the vehicle M approaches the intersection 60 based on, for example, a distance between the vehicle M and the intersection 60. If the position determination unit 14 determines that the vehicle M approaches the intersection 60 (if the vehicle M reaches the trigger request position Pa), the trigger input request unit 16 performs the trigger input request on the driver.

The trigger input request unit 16 performs the trigger input request by, for example, transmitting a control signal to the HMI 8, and outputting a voice saying "Please check the traveling direction (or right turning direction) of the vehicle in the intersection, and if passing is permitted, please perform the trigger input". The driver looks at the traveling direction in the intersection according to the trigger input request, confirms that there are no pedestrians or the like at the pedestrian cross-walk 70, and then, performs the trigger input. When the trigger input by the driver is detected, the vehicle control unit 19 increases the vehicle speed and causes the vehicle M to pass through the intersection 60. The vehicle control unit 19 causes the vehicle M to pass through the intersection 60 at the speed corresponding to the right turn in the intersection according to traffic rules.

Figure 11A:
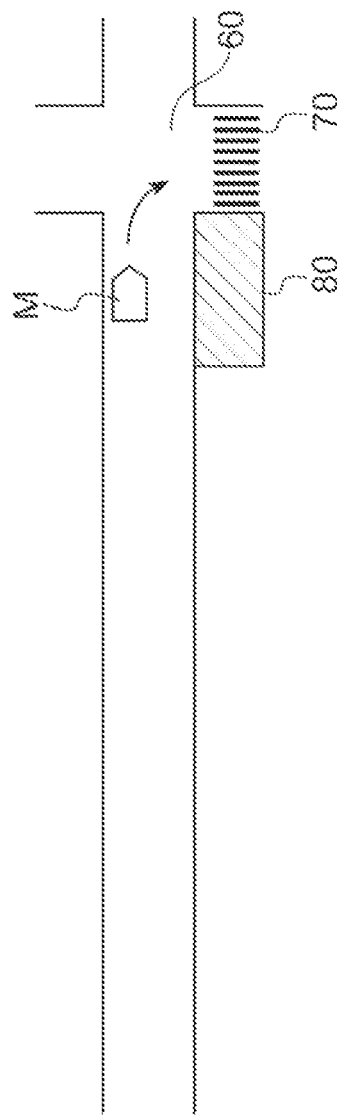
FIG. 11A is a plan view illustrating a situation in which the vehicle attempts to turn right in the intersection where there is no traffic signal.
Figure 11B:
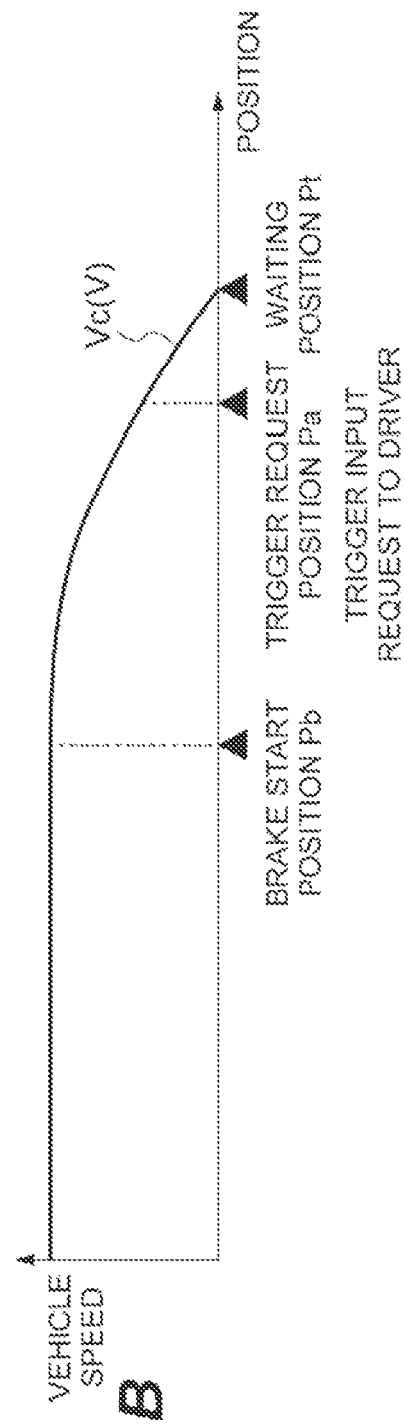
FIG. 11B is a graph illustrating the vehicle speed profile when the trigger input is not detected.

FIG. 11A is a plan view illustrating a situation in which the vehicle attempts to turn right in the intersection where there is no traffic signal. FIG. 11A illustrates the same situation as FIG. 10A. FIG. 11B is a graph illustrating a vehicle speed profile when the trigger input is not detected.

In the situation illustrated in FIG. 11A and FIG. 11B, in the autonomous driving system 100, in order for the right turn of the vehicle M, the vehicle speed of the vehicle M exceeding the brake start position Pb is decelerated along the vehicle stop speed profile Vc. The trigger input request unit 16 performs the trigger input request on the driver when the vehicle M reaches the trigger request position Pa. Since the trigger input by the driver is not detected, the vehicle control unit 19 causes the vehicle M to stop at the waiting position Pt according to the vehicle stop speed profile Vc.

If the intersection where there is no traffic signal is the target point, the route generation unit 15 does not necessarily need to set the waiting position Pt within the intersection. The route generation unit 15 may set the waiting position Pt before the intersection. The route generation unit 15 may individually set the waiting position Pt according to the traveling route. The route generation unit 15 may individually set the waiting position Pt according to the traveling route such that the traveling direction of vehicle M (right turn, left turn, straight ahead or the like) in the intersection where there is no traffic signal becomes a position visible to the driver. If there is a stop line before the intersection in the situation illustrated in FIG. 10A, the route generation unit 15 may cause the vehicle M to stop at the stop line.

Control Method of Autonomous Driving System

Next, a control method of the autonomous driving system 100 will be described with reference to the drawings.

Stop Route Generation Processing

Figure 12:
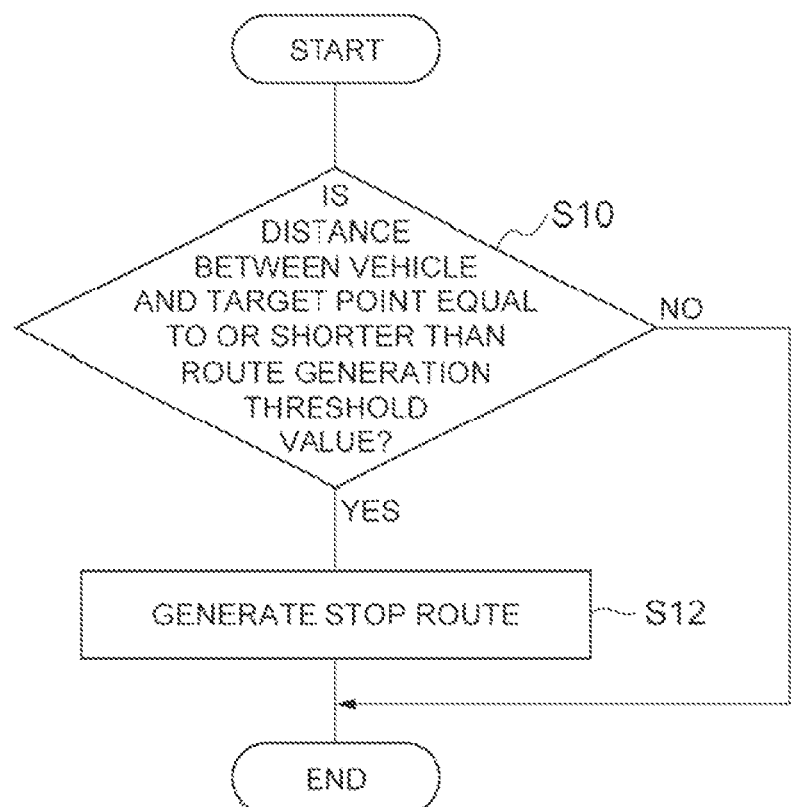
FIG. 12 is a flowchart illustrating stop route generation processing.

FIG. 12 is a flowchart illustrating the stop route generation processing. The processing in the flowchart illustrated in FIG. 12 is performed when the vehicle is in the autonomous driving.

As illustrated in FIG. 12, as S10, the ECU 10 of the autonomous driving system 100 determines whether or not the distance between the autonomously driving vehicle and the target point is equal to or shorter than the route generation threshold value using the position determination unit 14. The position determination unit 14 determines whether or not the distance between the vehicle and the target point is equal to or shorter than the route generation threshold value based on the position of the vehicle on the map, the map information and the traveling route for the autonomous driving. If it is determined that the distance between the autonomously driving vehicle and the target point is equal to or shorter than the route generation threshold value (YES in S10), the ECU 10 makes the process proceed to S12. If it is not determined that the distance between the autonomously driving vehicle and the target point is equal to or shorter than the route generation threshold value (NO in S10), the ECU 10 ends the current processing. Thereafter, the ECU 10 repeats the processing from S10 again after a certain time elapsed.

In S12, the ECU 10 generates the stop route using the route generation unit 15. The stop route includes the stop path and the vehicle stop speed profile. The route generation unit 15 generates the stop path based on, for example, the traveling route, the map information, the external environment of the vehicle, and the traveling state of the vehicle. The route generation unit 15 generates the vehicle stop speed profile based on the information such as the legal speed (or any set speed) included in path and the map information, for example. The route generation unit 15 generates the stop route according to the target point.

When using the path same as the passing route generated in the past as the stop route, the route generation unit 15 may generate only the vehicle stop speed profile. When the stop route is generated, the ECU 10 ends the stop route generation processing for the current target point.

Figure 13:
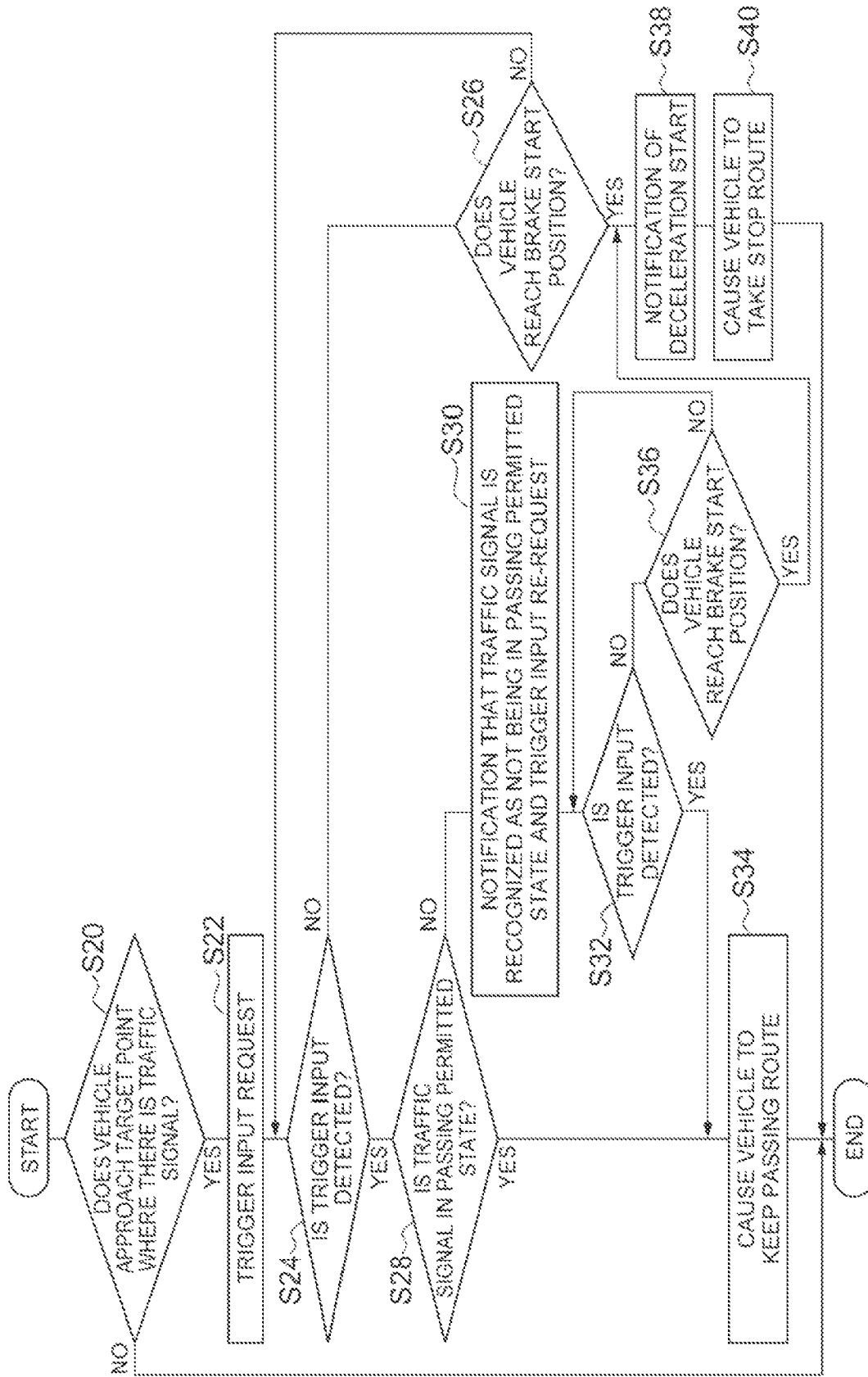
FIG. 13 is a flowchart illustrating trigger input detection processing for a target point where there is a traffic signal.

Trigger Input Detection Processing for Target Point Where There is Traffic Signal FIG. 13 is a flowchart illustrating the trigger input detection processing for the target point where there is a traffic signal. The processing in the flowchart illustrated in FIG. 13 is performed when the stop route for the target point where there is a traffic signal is generated and the vehicle is in the autonomous driving.

As illustrated in FIG. 13, as S20, the ECU 10 determines whether or not the autonomously driving vehicle approaches the target point where there is a traffic signal using the position determination unit 14. The position determination unit 14 determines whether or not the autonomously driving vehicle approaches the target point where there is a traffic signal based on the position of the vehicle on the map, the map information, and the traveling route for the autonomous driving.

If it is determined that the autonomously driving vehicle approaches the target point where is a traffic signal (YES in S20), the ECU 10 makes the process proceed to S22. If it is not determined that the autonomously driving vehicle approaches the target point where is a traffic signal (NO in S20), the ECU 10 ends the current processing. Thereafter, the ECU 10 repeats the processing from S20 after a certain time elapsed.

In S22, the ECU 10 performs a trigger input request on the driver using the trigger input request unit 16 (trigger input request step). The trigger input request unit 16 performs the trigger input request on the driver by transmitting the control signal to the HMI 8 and outputting a voice from the speaker of the HMI 8. Thereafter, the ECU 10 makes the process proceed to S24.

In S24, the ECU 10 determines whether or not the trigger input is detected using the trigger input detection unit 17 (trigger input detection step). The trigger input detection unit 17 detects at least one of the trigger input among the input by the operation of the trigger input unit 8a by the driver, the input by the accelerator operation, the input by touching the steering touch sensor 6, and the like. When the trigger input is detected (YES in S24), the ECU 10 makes the process proceed to S28. When the trigger input is not detected (NO in S24), the ECU 10 makes the process proceed to S26.

In S26, the ECU 10 determines whether or not the vehicle reaches the brake start position using the vehicle control unit 19. The vehicle control unit 19 determines whether or not the vehicle reaches the brake start position based on the stop route (the vehicle stop speed profile) and the position of the vehicle on the map. If it is determined that the vehicle reaches the brake start position (YES in S26), the ECU 10 makes the process proceed to S38. If it is not determined that the vehicle reaches the brake start position (NO in S26), the ECU 10 makes the process return to S24 and determines again whether or not the trigger input is detected.

In S28, the ECU 10 determines whether or not the traffic signal located in the target point is in the passing permitted state (traffic signal recognition step) using the traffic signal recognition unit 18. The traffic signal recognition unit 18 determines whether or not the traffic signal is in the passing permitted state based on the result of detection performed by the external sensor 2. If it is determined that the traffic signal is in the passing permitted state (YES in S28), the ECU 10 makes the process proceed to S34. If it is not determined that the traffic signal is in the passing permitted state (NO in S28), the ECU 10 makes the process proceed to S30.

In S30, the ECU 10 performs the notification that the traffic signal 50 is recognized as not being in the passing permitted state and the trigger input re-request on the driver using the trigger input request unit 16 (first re-request step). The trigger input request unit 16 performs the notification and the re-requests on the driver by, for example, transmitting a control signal to the HMI 8 and outputting a voice from the speaker of the HMI 8. The trigger input request unit 16 requests the driver to perform the trigger input of which the type is different from that of the trigger input before the re-request. Thereafter, the ECU 10 makes the process proceed to S32.

In S32, the ECU 10 determines whether or not the re-input of the trigger input is detected using the trigger input detection unit 17 (trigger input detection step). If the input type requested to the driver is performed in the trigger input re-request by the trigger input request unit 16, the trigger input detection unit 17 detects the trigger input. When the trigger input is detected (YES in S32), the ECU 10 makes the process proceed to S34. When the trigger input is not detected (NO in S32), the ECU 10 makes the process proceed to S36.

In S34, the ECU 10 execute the passing route using the vehicle control unit 19 (vehicle control step). The vehicle control unit 19 causes the vehicle to pass through the target point along the passing route by transmitting a control signal to the actuator 9. If the trigger input is detected before deceleration of the vehicle along the stop route is started, the vehicle control unit 19 causes the vehicle to pass through the target point along the passing route without performing the deceleration of the vehicle along the stop route.

In S36, the ECU 10 determines whether or not the vehicle reaches the brake start position using the vehicle control unit 19. If it is determined that the vehicle reaches the brake start position (YES in S36), the ECU 10 makes the process proceed to S38. If it is not determined that the vehicle reaches the brake start position (NO in S36), the ECU 10 makes the process returns to S32, and determines again whether or not the trigger input is detected.

In S38, the ECU 10 notifies the driver of the deceleration start using the vehicle control unit 19. The vehicle control unit 19 notifies the driver of the deceleration start by transmitting a control signal to the HMI 8 and outputting a voice from the speaker of the HMI 8. Thereafter, the ECU 10 makes the process proceed to S40.

In S40, the ECU 10 executes the stop route using the vehicle control unit 19 (vehicle control step). The vehicle control unit 19 causes the vehicle to decelerate along the stop route by sending a control signal to the actuator 9. If the trigger input is not detected thereafter, the vehicle control unit 19 causes the vehicle to stop without passing through the target point.

As described above, the trigger input detection processing for the target point where there is a traffic signal was described, however, in the processing in S26, it may not be determined whether or not the vehicle reaches the brake start position but may be determined whether or not a first set time set in advance has elapsed from the trigger input request. Similarly, in the process in S36 also, it may be determined whether or not a second setting time set in advance has elapsed from the trigger input re-request. The first set time and the second set time can be respectively a sufficient time for the driver to check the traffic signal and determine whether the trigger input is necessary or not. In addition, the first set time and the second set time can be respectively set as a time equal to or shorter than a remaining time for the vehicle to reach the brake start position.

Furthermore, the processing in the flowchart illustrated in FIG. 13 ends when the autonomous driving ends even during the processing. This point is the same to the processing items as in FIG. 14 to FIG. 17.

Additional Processing After Trigger Input

Figure 14:
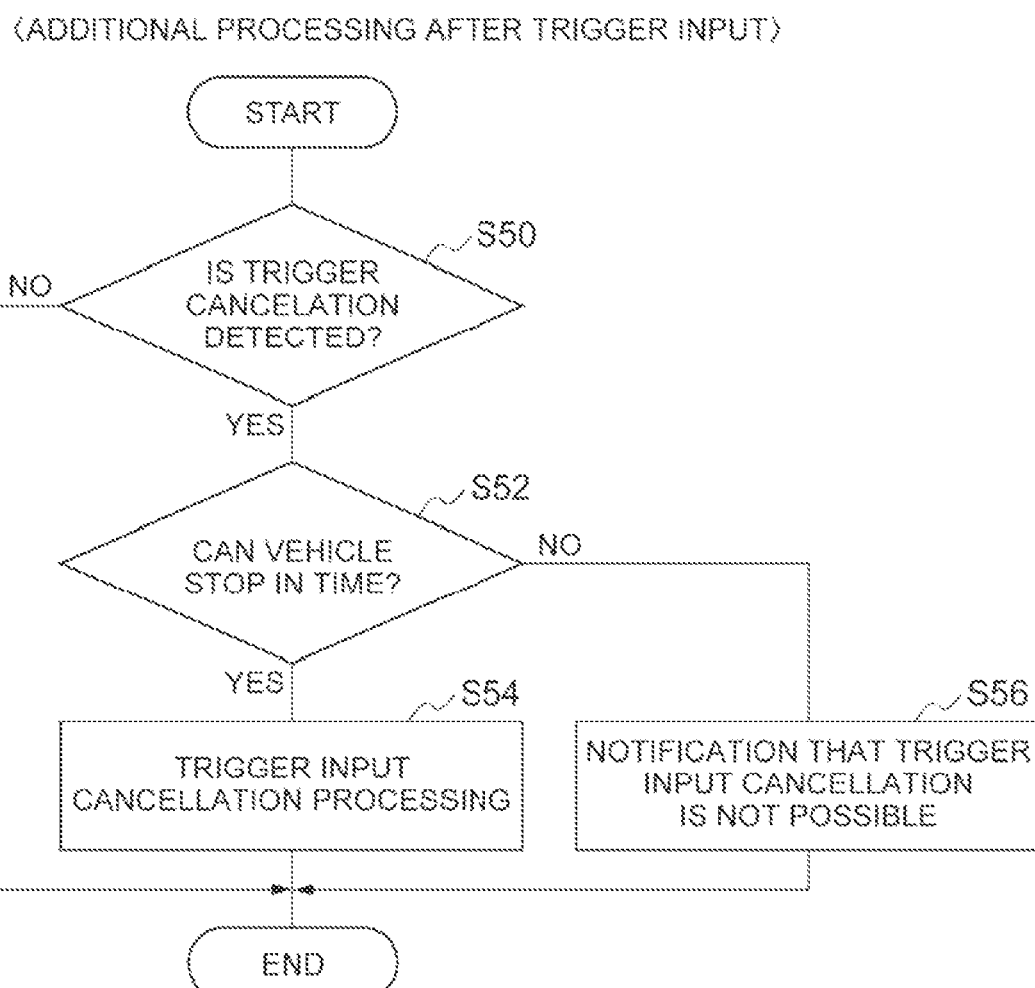
FIG. 14 is a flowchart illustrating additional processing after the trigger input.

FIG. 14 is a flowchart illustrating additional processing after the trigger input. The processing in the flowchart illustrated in FIG. 14 is performed, for example, if the trigger input is detected in S24 in FIG. 13. The processing in the flowchart illustrated in FIG. 14 may be performed if the trigger input is detected in S94 in FIG. 17 described later. The processing in the flowchart illustrated in FIG. 14 ends if the vehicle is stopped along the stop route or if the vehicle passes through the target point even during the processing.

As illustrated in FIG. 14, as S50, the ECU 10 determines whether or not the trigger cancelation is detected using the trigger input detection unit 17 (trigger cancelation detection step). For example, when the driver operates the trigger cancellation unit 8b, the trigger input detection unit 17 detects the trigger cancellation. If the trigger cancelation is detected (YES in S50), the ECU 10 makes the process proceed to S52. If the trigger cancelation is not detected (NO in S50), the ECU 10 makes the current processing end. Thereafter, the ECU 10 repeats the processing from S50 again after a certain time elapsed.

In S52, the ECU 10 determines whether or not the vehicle can stop in time using the vehicle control unit 19. The vehicle control unit 19 determines whether or not the vehicle can stop in time based on the stop position of the vehicle on the map, the stop position of the vehicle on the stop route, and the traveling state of the vehicle. If it is determined that the vehicle can stop in time (YES in S52), the ECU 10 makes the process proceed to S54. If it is determined that the vehicle cannot stop in time (NO in S52), the ECU 10 makes the process proceed to S56.

In S54, the ECU 10 performs the trigger cancellation processing using the vehicle control unit 19. If the vehicle does not reach the brake start position, the vehicle control unit 19 cancels the trigger input and returns to the process to S24 in FIG. 13. If the vehicle has already passed the brake start position and approaches the target point along the passing route, the vehicle control unit 19 cancels the trigger input and shifts the route from the passing route to the stop route.

In S56, the ECU 10 notifies the driver that the trigger cancellation is not possible using the vehicle control unit 19. The vehicle control unit 19 notifies that the trigger cancellation is not possible by transmitting the control signal to the HMI 8 and outputting a voice and/or the image.

Additional Processing When Passing Route is Executed

Figure 15:
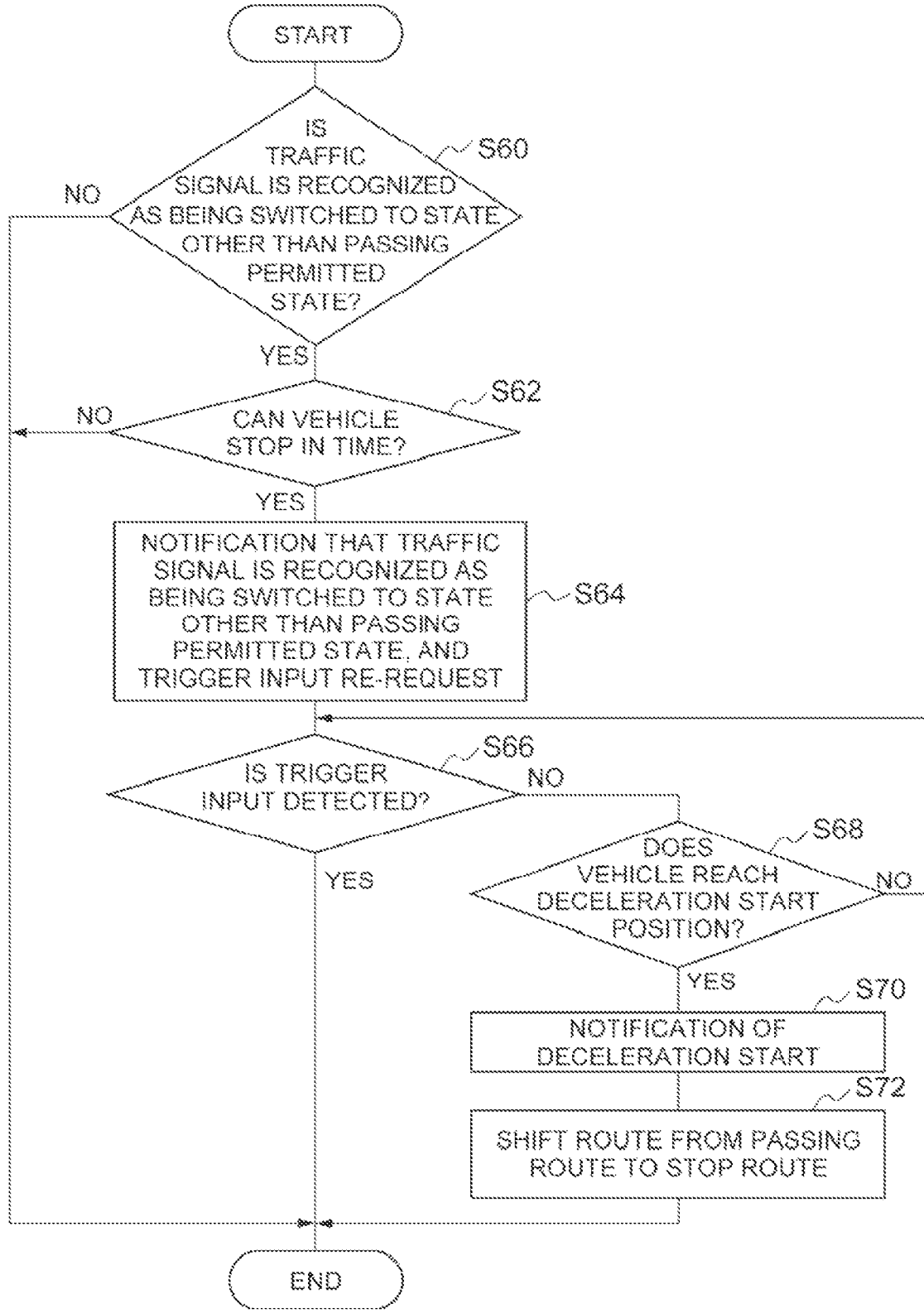
FIG. 15 is a flowchart illustrating additional processing when the passing route is executed.

FIG. 15 is a flowchart illustrating the additional processing when the passing route is executed. The processing in the flowchart illustrated in FIG. 15 is performed when the passing route is executed in S34 in FIG. 14, S96 in FIG. 17 to be described later, or when the route is shifted from the stop route. The processing in the flowchart illustrated in FIG. 15 ends when the vehicle passes through the target point even during the processing.

As illustrated in FIG. 15, as S60, the ECU 10 determines whether or not the traffic signal recognition unit 18 recognizes that the traffic signal is switched to a state other than the passing permitted state (traffic signal recognition step). The traffic signal recognition unit 18 determines whether or not the traffic signal is switched to a state other than the passing permitted state based on the result of detection performed by the external sensor 2, for example. If it is determined that the switching of the traffic signal to the state other than the passing permitted state is recognized (YES in S60), the ECU 10 makes the process proceed to S62. If it is not determined that the switching of the traffic signal to the state other than the passing permitted state is recognized (NO in S60), the ECU 10 makes the process proceed to S60. Thereafter, the ECU 10 repeats the processing again from S60.

In S62, the ECU 10 determines whether or not the vehicle can stop in time using the vehicle control unit 19. If it is determined that the vehicle can stop in time (YES in S62), the ECU 10 makes the process proceed to S64. If it is determined that the vehicle cannot stop in time (NO in S62), the ECU 10 ends the passing processing when the passing route is executed.

In S64, the ECU 10 notifies the driver that the switching of the traffic signal to the state other than the passing permitted state is recognized, and performs the trigger input re-request using the trigger input request unit 16 (second re-request step). The trigger input request unit 16 performs the traffic signal switching notification and re-request on the driver by transmitting a control signal to the HMI 8 and outputting a voice from the speaker of the HMI 8. The trigger input request unit 16 request the driver to perform the trigger input of which the type is different from that of the trigger input before the re-request. Thereafter, the ECU 10 makes the process proceed to S66.

In S66, the ECU 10 determines whether or not the trigger input is detected by the trigger input detection unit 17 (trigger input detection step). If the input type requested to the driver is performed in the trigger input re-request by the trigger input request unit 16, the trigger input detection unit 17 detects the trigger input. If the trigger input is detected (YES in S66), the ECU 10 ends the passing process when the passing route is executed. If the trigger input is not detected (NO in S66), the ECU 10 makes the process proceed to S68.

In S68, the ECU 10 determines whether or not the vehicle reaches the deceleration start position using the vehicle control unit 19. The vehicle control unit 19 determines whether or not the vehicle reaches the deceleration start position based on the stop position on the stop route, the position of the vehicle on the map, and the traveling state of the vehicle. If it is determined that the vehicle reaches the deceleration start position (YES in S68), the ECU 10 makes the process proceed to S70. If it is not determined that the vehicle reaches the deceleration start position (NO in S68), the ECU 10 makes the process return to S66 and repeats the trigger input detection.

In S70, the ECU 10 notifies the driver of the deceleration start using the vehicle control unit 19. The vehicle control unit 19 notifies the driver of the deceleration start by transmitting a control signal to the HMI 8 and outputting a voice from the speaker of the HMI 8. Thereafter, the ECU 10 makes the process proceed to S72.

In S72, the ECU 10 shifts the route from the passing route to the stop route using the vehicle control unit 19 (vehicle control step). The vehicle control unit 19 causes the vehicle to decelerate by shifting the route from the passing route to the stop route, and to stop without passing through the target point.

Additional Processing When Stop Route is Executed

Figure 16:
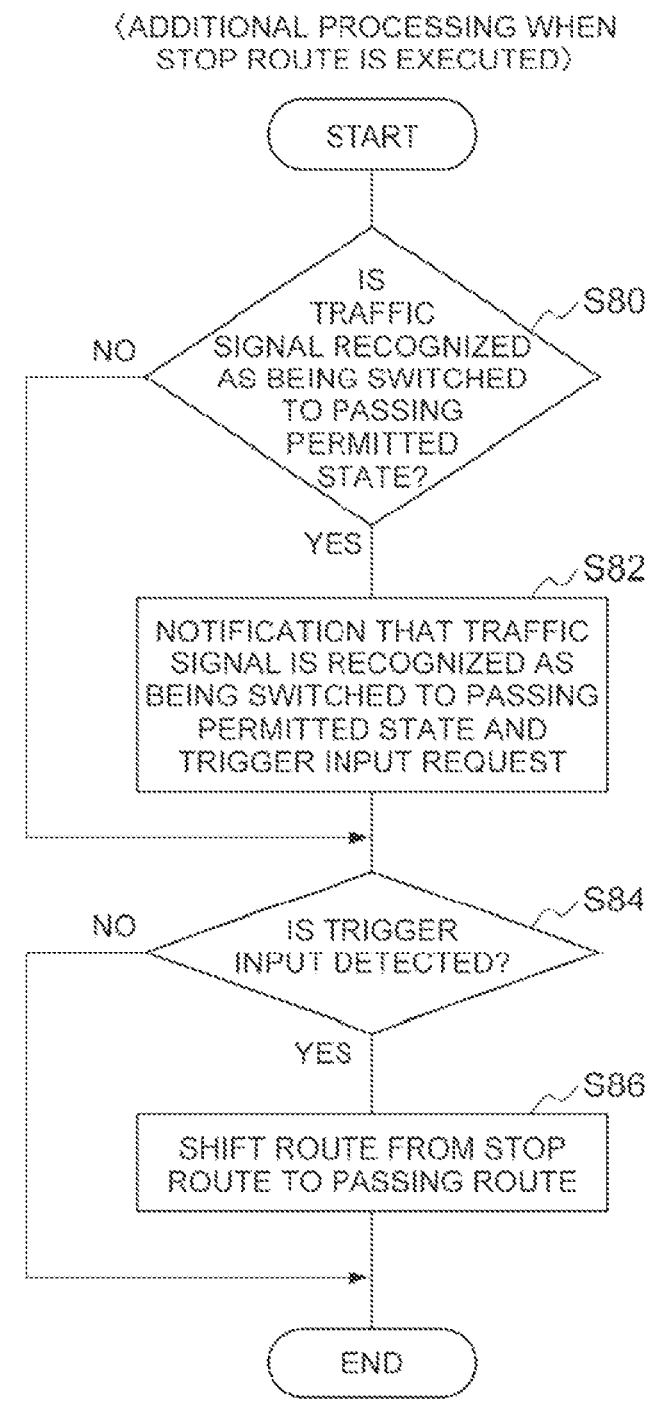
FIG. 16 is a flowchart illustrating additional processing when the stop route is executed.

FIG. 16 is a flowchart illustrating the additional processing when the stop route is executed. The processing in the flowchart illustrated in FIG. 16 is performed when the stop route is executed in S40 in FIG. 13, S98 in FIG. 17 to be described later, or when the route is switched from the passing route. The processing in the flowchart illustrated in FIG. 16 ends the vehicle is stopped even during the processing.

As illustrated in FIG. 16, as S80, the ECU 10 determines whether or not the traffic signal recognition unit 18 recognizes that the traffic signal is switched to the passing permitted state (traffic signal recognition step). If it is determined that the switching of the traffic signal to the passing permitted state is recognized (YES in S80), the ECU 10 makes the process proceed to S82. If it is determined that the traffic signal is not recognized as being switched to the passing permitted state (NO in S80), the ECU 10 makes the process proceed to S84.

In S82, the ECU 10 notifies the driver that the traffic signal is switched to the passing permitted state and performs the second trigger input request using the trigger input request unit 16 (second trigger input request step). Thereafter, the ECU 10 makes the process proceed to S84.

In S84, the ECU 10 determines whether or not the trigger input is detected by the trigger input detection unit 17 (trigger input detection step). If it determined that the trigger input is detected (YES in S84), the ECU 10 makes the process proceed to S86. If it determined that the trigger input is not detected (NO in S84), the ECU 10 ends the current processing. Thereafter, the ECU 10 repeats the processing again from S80.

In S86, the ECU 10 shifts the route from the stop route to the passing route using the vehicle control unit 19 (vehicle control step). The vehicle control unit 19 causes the vehicle to pass through the target point by shifting the route from the stop route to the passing route.

Figure 17:
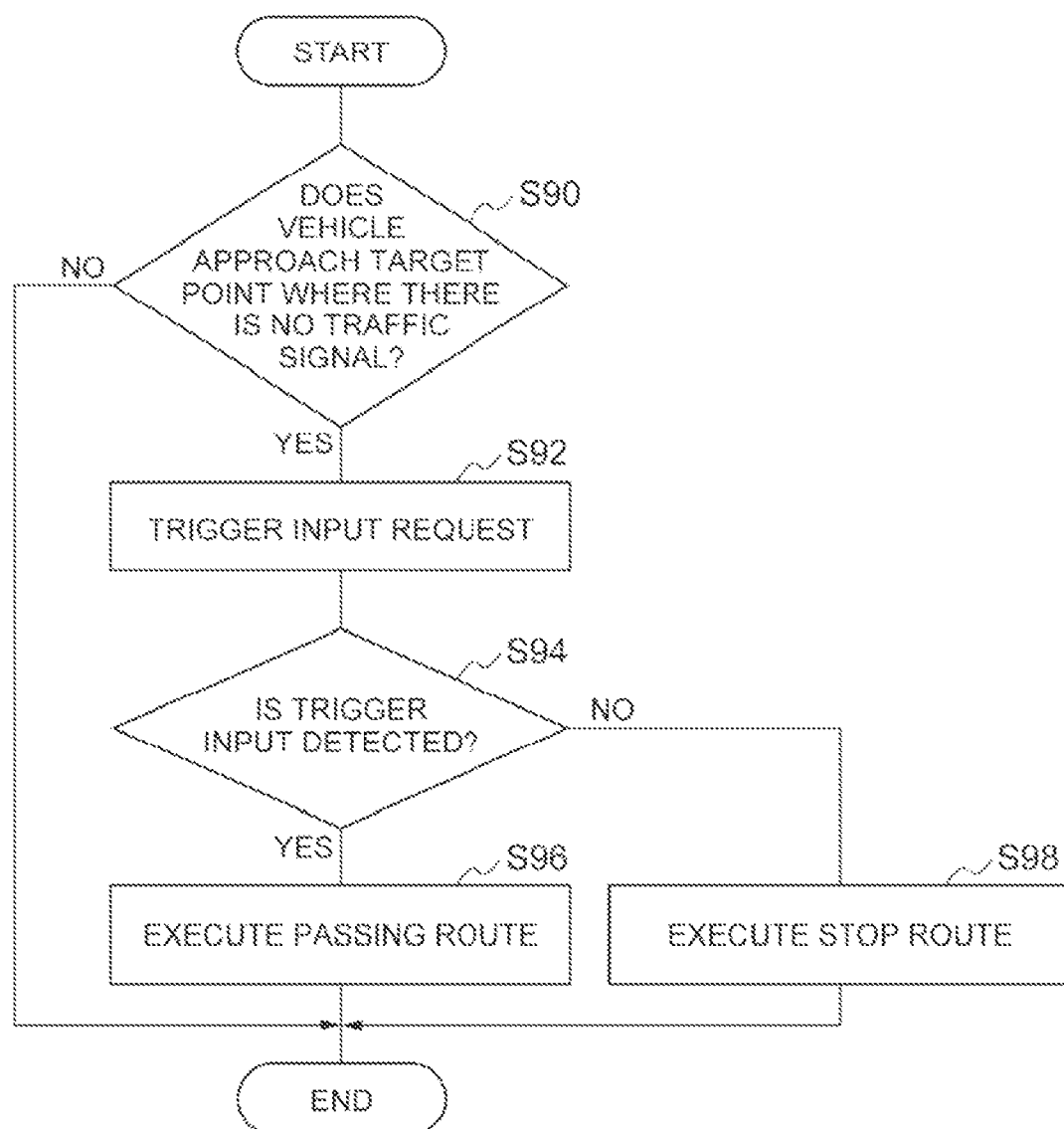
FIG. 17 is a flowchart illustrating trigger input detection processing for the target point where there is no traffic signal.

Trigger Input Detection Processing for the Target Point Where There is No Traffic Signal FIG. 17 is a flowchart illustrating the trigger input detection processing for the target point where there is no traffic signal. The processing in the flowchart illustrated in FIG. 17 is performed when the stop route for the target point where there is no traffic signal is generated and the vehicle is in the autonomous driving.

As illustrated in FIG. 17, as S90, the ECU 10 determines whether or not the autonomously driving vehicle approaches the target point where there is no traffic signal using the position determination unit 14. The position determination unit 14 determines whether or not the autonomously driving vehicle approaches the target point where there is no traffic signal based on the position of the vehicle on the map, the map information, and the traveling route for the autonomous driving.

If it is determined that the autonomously driving vehicle approaches the target point where is no traffic signal (YES in S90), the ECU 10 makes the process proceed to S92. If it is not determined that the autonomously driving vehicle approaches the target point where is no traffic signal (NO in S90), the ECU 10 ends the current processing. Thereafter, the ECU 10 repeats the processing again from S90 after a certain time elapsed.

In S92, the ECU 10 performs a trigger input request on the driver using the trigger input request unit 16 (trigger input request step). The trigger input request unit 16 performs the trigger input request on the driver by transmitting a control signal to the HMI 8 and outputting a voice from the speaker of the HMI 8. Thereafter, the ECU 10 makes the process proceed to S94.

In S94, the ECU 10 determines whether or not the trigger input is detected using the trigger input detection unit 17 (trigger input detection step). If it is determined that the trigger input is detected (YES in S94), the ECU 10 makes the process proceed to S96. If it is not determined that the trigger input is detected (NO in S94), the ECU 10 makes the process proceed to S98.

In S96, the ECU 10 executes the passing route using the vehicle control unit 19 (vehicle control step). The vehicle control unit 19 causes the vehicle to pass through the target point along the passing route.

In S98, the ECU 10 executes the stop route using the vehicle control unit 19 (vehicle control step). The vehicle control unit 19 causes the vehicle to decelerate along the stop route and to stop at the target point without passing through the target point. The vehicle control unit 19 may notify the driver of the deceleration start before the deceleration of the vehicle along the stop route starts.

Operational Effects of Autonomous Driving System and Control Method of Autonomous Driving System According to the autonomous driving system 100 and the control method thereof according to the embodiment described above, if the autonomously driving vehicle approaches the target point such as an intersection, and the driver is requested to perform the trigger input for the vehicle to pass through the target point, the vehicle is caused to pass through the target point if the trigger input is detected, and the vehicle is caused to decelerate and stop at the target point without passing through the target point if the trigger input is not detected. Therefore, in the autonomous driving system 100 and the control method thereof, it is possible to cause the vehicle to pass through the target point after obtaining the driver's decision whether or not to pass through the target point.

In the autonomous driving system 100 and the control method thereof, the trigger input request is performed before the deceleration of the vehicle starts, and if the trigger input is detected before the deceleration of the vehicle starts, the vehicle is caused to pass through the target point without performing the deceleration of the vehicle to stop. Therefore, according to the autonomous driving system 100 and the control method thereof, the driver can perform the trigger input earlier according to the trigger input request compared to a case where the vehicle is always decelerated toward the target point, and thus, it is possible to cause the vehicle to pass through the target point without performing the deceleration of the vehicle to stop.

According to the autonomous driving system 100 and the control method thereof, even if the deceleration of the vehicle to stop is started for stopping the vehicle without passing through the target point without the trigger input being detected, since it is possible to cause the vehicle to stop the deceleration and to pass through the target point if the trigger input is detected, it is possible to cause the vehicle to pass through the target point according to the driver's decision even if the driver's trigger input is delayed.

According to the autonomous driving system 100 and the control method thereof, even if the driver performs the trigger input, when the traffic signal recognition unit recognizes that the traffic signal is not in the passing permitted state, since the trigger input re-request is performed by notifying the driver that the traffic signal is not in the passing permitted state, it is possible to prevent the driver from performing an erroneous decision in the situation in which the traffic signal recognition unit recognizes that the traffic signal is not in the passing permitted state.

According to the autonomous driving system 100 and the control method thereof, even if the driver performs the trigger input, when the switching of the traffic signal to the state other than the passing permitted state is recognized, the driver is notified that the switching of the traffic signal to the state other than the passing permitted state is recognized and the trigger input re-request is performed, the driver can be notified that the traffic signal is switched to the state other than the passing permitted state after the trigger input is performed, and thus, it is possible for the driver to perform the decision according to the situation.

According to the autonomous driving system 100 and the control method thereof, in the trigger input re-request, since the driver is requested to perform trigger input of which the type is different from that of the trigger input before the re-request, it is possible to prevent the driver from easily performing the trigger input without recognizing the situation in which the trigger input is requested.

The preferred embodiments of the present disclosure are described above, however, the present disclosure is not limited to the above-described embodiments. In addition to the above-described embodiments, the present disclosure can be embodied in various forms including various modifications and improvements based on the knowledge of those skilled in the art.

The trigger input detection unit 17 may detect the trigger input before the trigger input request. There is a possibility that the driver may memorize the target point on the everyday traveling route, and may perform the trigger input by recognizing the lighting state or the like of the traffic signal at the target point earlier than a time the vehicle reaches the trigger request position. If a distance between the autonomously driving vehicle and the target point is equal to or shorter than a trigger detection threshold value, the trigger input detection unit 17 detects the trigger input before the trigger input request as the trigger input for causing the vehicle to pass through the target point in front of the vehicle. The trigger detection threshold value is a threshold value set in advance. The determination may be made by the arrival time to the target point instead of the distance. In this case, the trigger input detection unit 17 notifies the driver that the trigger input for the vehicle to pass through the target point is detected, by transmitting a control signal to the HMI 8 and outputting a voice and/or an image. Instead of the image output by the display, the lamp or the like of the instrument panel may be turned on or blinked.

The position determination unit 14 may change the trigger request position according to a state of the driver. The position determination unit 14 may determine whether or not the driver is concentrating on the driving based on, for example, the contact information from the steering touch sensor 6 and the information of imaging the driver by the driver monitor camera 7. Examples of the cases where the driver is not concentrating on the driving are a case where the driver is stoking, a case where the driver does not grasp the steering wheel, and the like. An example of the case where the driver is concentrating on the driving is a case where the driver holds the steering wheel with the face facing the front of the vehicle, or the like. When it is determined that the driver is not concentrating on driving, the position determination unit 14 may set the trigger request position away from the target point compared to the case where it is determined that the driver is concentrating on the driving. When it is determined that the driver is concentrating on the driving, the trigger input request unit 16 may omit the trigger input request.

The trigger input detection unit 17 does not necessarily need to detect multiple types of trigger input. The trigger input detection unit 17 may detect at least one of the input by the driver's manual operation on the trigger input unit 8a provided in the vehicle, the input by the driver's accelerator operation on the accelerator pedal of the vehicle, or the input by touching the steering touch sensor 6, as the trigger input. The touch sensor of the vehicle is not limited to the steering touch sensor 6, but may be a touch sensor provided in the instrument panel of the vehicle, a touch sensor provided in the armrest of the vehicle, or may be a touch sensor provided inside the door of the vehicle. In addition, in order to detect the driver's grip of the steering wheel, a grip sensor incorporated in the steering wheel and detecting the driver's grip of the steering wheel may be used. If it is detected by the signal from the grip sensor that the gripping force of driver's both hands is equal to or larger than a certain threshold value, the trigger input detection unit 17 may detect the trigger input.

In the trigger input re-request, the trigger input request unit 16 may request the driver to perform the trigger input of which the type is the same as that of the trigger input before re-request. The trigger input request unit 16 requests the driver to perform the trigger input of which the type is the same as that of the trigger input before the re-request and an amount of operation is larger than that before the re-request. If the button-type trigger input unit 8a is operated as the trigger input before the re-request, the trigger input request unit 16 may request the driver to perform the operation of pushing a button deeply or pressing the button for a long time compared to that before the re-request, as the trigger input after the re-request. If the lever-type trigger input unit 8a is operated as the trigger input before the re-request, the trigger input request unit 16 may request the driver to perform the operation of pulling down the lever largely compared to that before the trigger re-request, as the trigger input after the re-request. If the accelerator pedal is operated as the trigger input before the re-request, the trigger input request unit 16 may request the driver to perform the operation of depressing the accelerator pedal deeply or depressing the accelerator pedal for a long time compared to that before the trigger re-request, as the trigger input after the re-request.

The route generation unit 15 does not necessarily need to start generating the stop route based on the distance between the autonomously driving vehicle and the target point. The time to arrival may be used instead of the distance. The route generation unit 15 may generate the stop route at a timing at which the generation processing is possible, regardless of the distance between the autonomously driving vehicle and the target point. The route generation unit 15 may generate the passing route and the stop route at the same timing. The vehicle control unit 19 may switch the route from the passing route to the stop route at the time when the vehicle reaches the brake start position without the trigger input being detected, not at the time when the trigger input request is performed on the driver.

The autonomous driving system 100 does not necessarily need to have the function of trigger cancellation. If trigger input is erroneous, the autonomous driving system 100 may have a configuration in which the driver ends the autonomous driving by operating the autonomous driving end input unit.

The autonomous driving system 100 does not necessarily need to have the returning function by the trigger input after the starting the deceleration. If the vehicle reaches the brake start position without trigger input being detected, the autonomous driving system 100 may have a configuration in which in which the vehicle is caused to temporarily stop without passing through the target point.

The autonomous driving system 100 does not necessarily need to recognize the lighting state of the traffic signal. The autonomous driving system 100 may have a configuration in which the vehicle is caused to pass through the target point or to stop without passing through the target point depending on the driver's trigger input, without recognizing the lighting state of the traffic signal. In this case, the autonomous driving system 100 does not need to include a traffic signal recognition unit 18.

The autonomous driving system 100 does not necessarily need to have a re-requesting function when it is recognized that the traffic signal is not in the passing permitted state. The trigger input request unit 16 may have a configuration in which only the notification is performed on the driver that the traffic signal is recognized as not being in the passing permitted state, without performing the trigger input re-request. In this case, the vehicle control unit 19 causes the vehicle to pass through the target point along the passing route when the driver does not perform the trigger cancellation operation (or an autonomous driving end operation).

In addition, in the re-request function described above, the autonomous driving system 100 may perform only the trigger input re-request without performing the notification that the traffic signal is recognized as not being in the passing permitted state. In addition, the trigger input request unit 16 may be configured to perform the notification and the trigger input re-request only when it is recognized that the traffic signal is in the passing prohibited state, and to perform the notification and the trigger input re-request when the traffic signal is recognized as being in the transition state.

The autonomous driving system 100 does not necessarily need to have a re-request function when the switching of the traffic signal to the state other than the passing permitted state is recognized. The trigger input request unit 16 may be configured to perform only the notification that the traffic signal is switched on the driver when the switching of the traffic signal to a state other than the passing permitted state is recognized.

In addition, in the re-request function described above, the trigger input request unit 16 may perform only the trigger input re-request without performing the notification that the traffic signal is switched. In the re-request function described above, the trigger input request unit 16 may be configured to perform the notification that the traffic signal is switched and the trigger input re-request only when the switching of the traffic signal to the passing prohibited state is recognized, and not to perform the notification that the traffic signal is switched and the trigger input re-request even when the switching of the traffic signal from the passing permitted state to the transition state is recognized.

The autonomous driving system 100 does not necessarily need to have a second request function when the switching of the traffic signal to the state other than the passing permitted state is recognized. The trigger input request unit 16 may be configured to perform only the notification on the driver that the switching of the traffic signal to the passing permitted state is recognized if the switching of the traffic signal to the passing permitted state is recognized while the of the driver's trigger input is not detected after the trigger input request. The trigger input request unit 16 may be configured not to perform any notification even if the switching of the traffic signal to the passing permitted state is recognized.

The autonomous driving system 100 does not necessarily need to perform the determination (S52, S62) whether or not the vehicle can stop in time. In the case where the vehicle is caused to pass through the target point along the passing route, when the driver's trigger cancelation is detected, the vehicle control unit 19 may cause the vehicle to decelerate and stop even if the deceleration increases. The trigger input request unit 16 may perform the notification on the driver that the switching of the traffic signal to a state other than the passing permitted state is recognized regardless of whether the stop of the vehicle is in time or not. The autonomous driving system 100 may set the intersection 60 as the target point even when the situation of the destination of right turn at the intersection 60 can be detected such as a case where the building 80 is not present in FIG. 10A.

The autonomous driving system 100 does not necessarily need to perform the deceleration start notification (S38 and S70). The autonomous driving system 100 may start the deceleration to cause the vehicle to stop without performing the deceleration start notification.

What is claimed is:

1. An autonomous driving system configured to perform an autonomous driving of a vehicle, comprising:
an electronic control unit (ECU) including a processor programmed to:
perform a trigger input request for requesting a driver of the vehicle to perform a trigger input for causing the vehicle to pass through a target point if the autonomously driving vehicle approaches the target point set in advance and positioned on a traveling route of the vehicle;
detect the driver's trigger input;
cause the vehicle to pass through the target point if the trigger input is detected, and cause the vehicle to decelerate and stop without passing through the target point if the trigger input is not detected;
recognize a lighting state of the traffic signal which is located in the target point and is corresponding to a traveling route of the vehicle;
notify the driver that the switching of the traffic signal to a state other than the passing permitted state is recognized and to perform the trigger input re-request if the switching of the traffic signal to the state other than the passing permitted state is recognized after the trigger input is detected; and
cause the vehicle to pass through the target point without temporarily stopping if the trigger input is detected after the trigger input re-request, and to cause the autonomously driving vehicle to decelerate and stop without passing through the target point if the trigger input is not detected after the trigger input re-request.

2. The autonomous driving system according to claim 1, wherein the target point is a pedestrian cross-walk where there is a traffic signal.

3. The autonomous driving system according to claim 1, wherein the ECU is programmed to cause the vehicle to pass through the target point without performing the deceleration of the vehicle if the trigger input is detected before starting the deceleration of the vehicle for causing the vehicle to stop without passing through the target point.

4. The autonomous driving system according to claim 1, wherein the ECU is programmed to cause the vehicle to stop the deceleration and to pass through the target point if the trigger input is detected after starting the deceleration of the vehicle for causing the vehicle to stop without passing through the target point.

5. The autonomous driving system according to claim 1, wherein the ECU is programmed to detect at least two inputs as the trigger input among an input by a driver's manual operation to a trigger input unit provided in the vehicle, an input by a driver's acceleration operation to an accelerator pedal of the vehicle, and an input by a driver's contact to a touch sensor of the vehicle, and request the driver to perform one type of the trigger input in the trigger input request, and request the driver to perform a plurality of types of the trigger input in the trigger input re-request.

6. A control method of an autonomous driving system that performs an autonomous driving of a vehicle, the method comprising:
requesting a driver of the vehicle to perform a trigger input for causing the vehicle to pass through a target point if the autonomously driving vehicle approaches the target point set in advance;
detecting the driver's trigger input;
controlling the autonomously driving vehicle to pass through the target point if the trigger input is detected, and to decelerate and stop without passing through the target point if the trigger input is not detected;
recognizing a lighting state of a traffic signal which is located in the target point and is corresponding to a traveling route of the vehicle;
notifying the driver that the switching of the traffic signal to a state other than the passing permitted state is recognized and to perform the trigger input re-request if the switching of the traffic signal to the state other than the passing permitted state is recognized after the trigger input is detected; and
wherein, in the step of controlling the vehicle, the vehicle is caused to pass through the target point without temporarily stopping if the trigger input is detected after the trigger input re-request, and to cause the autonomously driving vehicle to decelerate and stop without passing through the target point if the trigger input is not detected after the trigger input re-request.

7. The control method of the autonomous driving system according to claim 6,
wherein the target point is a pedestrian cross-walk where there is a traffic signal.

8. The control method of the autonomous driving system according to claim 6,
wherein, in the step of controlling the vehicle, the vehicle is caused to pass through the target point without performing the deceleration of the vehicle if the trigger input is detected before starting the deceleration of the vehicle for causing the vehicle to stop without passing through the target point.

9. The control method of the autonomous driving system according to claim 6,
wherein, in the step of controlling the vehicle, the vehicle is caused to stop the deceleration and to pass through the target point if the trigger input is detected after starting the deceleration of the vehicle for causing the vehicle to stop without passing through the target point.

10. The control method of the autonomous driving system according to claim 6,
wherein, in the step of detecting the trigger input, at least two inputs as the trigger input among an input by a driver's manual operation to a trigger input unit provided in the vehicle, an input by a driver's acceleration operation to an accelerator pedal of the vehicle, and an input by a driver's contact to a touch sensor of the vehicle, and request the driver to perform one type of the trigger input in the trigger input request, and request the driver to perform a plurality of types of the trigger input in the trigger input re-request.

11. A non-transitory computer readable medium having stored thereon instructions which, when executed by at least one ECU, cause the at least one ECU to execute processing comprising:
requesting a driver of the vehicle to perform a trigger input for causing the vehicle to pass through a target point if the autonomously driving vehicle approaches the target point set in advance;
detecting the driver's trigger input;
controlling the autonomously driving vehicle to pass through the target point if the trigger input is detected, and to decelerate and stop without passing through the target point if the trigger input is not detected;

recognizing a lighting state of a traffic signal which is located in the target point and is corresponding to a traveling route of the vehicle;

notifying the driver that the switching of the traffic signal to a state other than the passing permitted state is recognized and to perform the trigger input re-request if the switching of the traffic signal to the state other than the passing permitted state is recognized after the trigger input is detected; and wherein, in the step of controlling the vehicle, the vehicle is caused to pass through the target point without temporarily stopping if the trigger input is detected after the trigger input re-request, and to cause the autonomously driving vehicle to decelerate and stop without passing through the target point if the trigger input is not detected after the trigger input re-request.

12. The non-transitory computer readable medium according to claim 11, wherein the target point is a pedestrian cross-walk where there is a traffic signal.

13. The non-transitory computer readable medium according to claim 11, wherein, in the step of controlling the vehicle, the vehicle is caused to pass through the target point without performing the deceleration of the vehicle if the trigger input is detected before starting the deceleration of the vehicle for causing the vehicle to stop without passing through the target point.

14. The non-transitory computer readable medium according to claim 11, wherein, in the step of controlling the vehicle, the vehicle is caused to stop the deceleration and to pass through the target point if the trigger input is detected after starting the deceleration of the vehicle for causing the vehicle to stop without passing through the target point.

15. The non-transitory computer readable medium according to claim 11, wherein, in the step of detecting the trigger input, at least two inputs as the trigger input among an input by a driver's manual operation to a trigger input unit provided in the vehicle, an input by a driver's acceleration operation to an accelerator pedal of the vehicle, and an input by a driver's contact to a touch sensor of the vehicle, and request the driver to perform one type of the trigger input in the trigger input request, and request the driver to perform a plurality of types of the trigger input in the trigger input re-request.

* * * * *